(12) United States Patent
Aoki et al.

(10) Patent No.: US 8,355,339 B2
(45) Date of Patent: Jan. 15, 2013

(54) SIGNAL ANALYZER

(75) Inventors: Kazunori Aoki, Hadano (JP); Naofumi Naruse, Atsugi (JP)

(73) Assignee: Anritsu Corporation, Atsugi-shi (JP)

( * ) Notice: Subject to any disclaimer, the term of this patent is extended or adjusted under 35 U.S.C. 154(b) by 347 days.

(21) Appl. No.: 12/665,587

(22) PCT Filed: Jul. 1, 2008

(86) PCT No.: PCT/JP2008/001715
§ 371 (c)(1),
(2), (4) Date: Dec. 18, 2009

(87) PCT Pub. No.: WO2009/011095
PCT Pub. Date: Jan. 22, 2009

(65) Prior Publication Data
US 2010/0189001 A1 Jul. 29, 2010

(30) Foreign Application Priority Data
Jul. 19, 2007 (JP) .................................. 2007-188770

(51) Int. Cl.
H04W 24/00 (2009.01)

(52) U.S. Cl. .......................... 370/252; 370/468; 455/423

(58) Field of Classification Search .................. 370/252, 370/310, 311, 329, 431, 437, 468; 455/343.1, 455/343.5, 423, 67.11, 67.13, 67.15
See application file for complete search history.

(56) References Cited

U.S. PATENT DOCUMENTS 6,853,932 B1  2/2005  Wichelman et al.
7,069,005 B2 *  6/2006  Morikawa et al. ............ 455/423
2004/0059546 A1 *  3/2004  Morikawa et al. ............ 702/189

FOREIGN PATENT DOCUMENTS

| JP | A 2-17455 | 1/1990 |
| JP | A 7-12852 | 1/1995 |
| JP | A 2003-46431 | 2/2003 |
| JP | B2 3708458 | 10/2005 |
| JP | 2006-078314 | * 3/2006 |
| JP | A 2006-78314 | 3/2006 |

OTHER PUBLICATIONS

Extended European Search Report dated Aug. 30, 2012 for corresponding European Patent Application No. EP 08790114.
"Manual Operation Guide"—Making 3GPP TS 34.121 Tests Manually, Agilent Technologies 8960 Series 10 Wireless Communications Test Set, Oct. 11, 2006; pp. 1-87.
"$3^{rd}$ Generation Partnership Project; Technical Specification Group Terminal; Terminal Conformance Specification; Radio Transmission and Reception (FDD) (3G TS 34.121 version 1.7.2)", 3GPP, Feb. 1, 2000; pp. 1-140.

* cited by examiner

*Primary Examiner* — Kerri Rose
(74) *Attorney, Agent, or Firm* — Greer, Burns & Crain, Ltd.

(57) ABSTRACT

A signal analyzer for facilitating observation of a relative value, i.e., the quantity of variation in power between slots, at the time of analyzing the power of a signal which is to be measured and subjected to power control in units of slot. An analyzing section detects the power value of every slot of a signal which is to be measured and received at a receiving section, and calculates the relative value of the power value between each slot and a slot separated therefrom by a predetermined number. A display control section displays the relative values thus calculated as a graph at a display section by arranging them continuously in time series.

8 Claims, 18 Drawing Sheets

FIG. 17

|     | TPC cmd | Transmitter power control range (all units are in dB) | | | | | |
| --- | --- | --- | --- | --- | --- | --- | --- |
|     |         | 1dB step size | | 2dB step size | | 3dB step size | |
|     |         | Lower | Upper | Lower | Upper | Lower | Upper |
| (1) | +1 | +8  | +12 | +16 | +24 | +16 | +26 |
| (2) |  0 | −1  | +1  | −1  | +1  | −1  | +1  |
| (3) | −1 | −8  | −12 | −16 | −24 | −16 | −26 |

FIG. 18

| TPC_cmd group | Transmitter power control range after 10 equal TPC_cmd group (all units are in dB) | | | | Transmitter power control range after 7 equal TPC_cmd group (all units are in dB) | |
|---|---|---|---|---|---|---|
| | 1dB step size | | 2dB step size | | 3dB step size | |
| | Lower | Upper | Lower | Upper | Lower | Upper |
| (1) +1 | +8 | +12 | +16 | +24 | +16 | +26 |
| (2) 0 | −1 | +1 | −1 | +1 | −1 | +1 |
| (3) −1 | −8 | −12 | −16 | −24 | −16 | −26 |

SIGNAL ANALYZER

This application is a U.S. National Phase under 35 U.S.C. §371 of International Application No. PCT/JP2008/001715, filed Jul. 1, 2008.

TECHNICAL FIELD

The present invention relates to a signal analyzer for analyzing and displaying a signal controlled in transmission power with respect to each slot.

BACKGROUND OF THE INVENTION

One of the conventionally-known communication systems, in the fields of mobile communication, is adapted to divide a communication signal into short sections each named "slot" to control, with respect to each slot, the transmission power of the communication signal, and is exemplified by a CDMA system. This system encounters a problem that a mobile terminal far from a base station cannot perform communication with the base station without being interfered by other mobile terminal which is near the base station, resulting from the fact that the communication signals from the mobile terminals are multiplexed in the same frequency band. In order to solve the above-mentioned problem, the CDMA system employs a technology for controlling the transmission power of the mobile terminal in units of the slot with high speed.

FIG. 11 is a schematic diagram showing a frame format of an uplink (transmission from the mobile terminal to the base station) of a W-CDMA system known as one example of the CDMA system. In this system, a frame is defined as a communication unit, has a length of 10 ms, and constituted by 15 slots #0 to #14, each of which has a length of 667 μs, and is multiplexed with DPDCH indicating a data channel for transmitting user data and DPCCH indicating a control channel for transmitting control information. The DPCCH includes a pilot signal as a reference signal, TFCI having transmission format information, FBI having feedback information, and TPC indicating an instruction necessary to control the transmission power.

The TPC of the uplink indicates an instruction necessary to control the transmission power from the mobile terminal to the base station. On the other hand, each slot of a frame of a downlink (transmission from the base station to the mobile terminal) includes TPC indicating an instruction necessary to control the transmission power from the base station to the mobile terminal. The transmission power of the mobile terminal is controlled with respect to each slot on the basis of the TPC of the downlink.

The function designed to control the transmission power of the mobile terminal from the base station is described as "Closed Loop Power Control" (hereinafter simply referred to as "CLPC") or "Inner Loop Power Control". According to the CLPC, the base station receives a signal from the mobile terminal to measure the signal, instructs the mobile terminal to increase or decrease the transmission power on the basis of the measurement result, and controls the transmission power of the mobile terminal to increase or decrease the signal in response to the instruction. Additionally, the transmission power is increased or decreased in increments of a step size defined as the difference between transmission powers of slots adjacent to each other, and outputted from the base station to the mobile terminal.

In other words, in response to an instruction indicated by the TPC from the base station, the mobile terminal increases or decreases, with respect to each slot of the uplink, the transmission power by a step size set by the base station, and outputs a signal using the increased or decreased transmission power.

A conventionally-known test device conducts a test on the CLPC function of the above-mentioned mobile terminal. FIG. 12 is a block diagram showing a signal analyzer having a function the same as the feature of the conventional mobile terminal test device.

The signal analyzer 1 is shown in FIG. 12 and comprises a connecting terminal 1a, a directional coupler 2, a power control setting section 3, a control section 4, a transmitting section 5, a receiving section 6, an analyzing section 7, a judging section 8, a display control section 9, and a display section 10. The transmitting section 5 has a power control request section 5a and a transmitting circuit 5b. The receiving section 6 has a receiving circuit 6a, an analog-to-digital (A/D) converter 6b, and a memory section 6c. The analyzing section 7 has a slot detecting section 7a, a slot power detecting section 7b, and an analysis result memory section 7c.

The connecting terminal 1a is connected to a mobile terminal 11 identified as a test object through a coaxial cable, and connected to the transmitting circuit 5b and the receiving circuit 6a through the directional coupler 2.

The power control setting section 3 is adapted to set, to the power control request section 5a through the control section 4, information on the number of slots of a signal to be transmitted from the mobile terminal 11, whether to have the transmission power increase or decrease, a step size and the like. And the power control setting section 3 is adapted to instruct to start and stop the test.

The control section 4 is adapted to control, to the power control request section 5a on the basis of the information from the power control setting section 3, information on the number of slots of a signal to be transmitted from the mobile terminal 11, whether to have the transmission power increase or decrease, a step size and the like. Further, the control section 4 is adapted to output, to the slot detecting section 7a of the analyzing section 7, a signal to instruct the slot detecting section 7a to start the measurement of the transmission power of each slot in response to the instruction from the power control setting section 3, and to output a signal to instruct the slot detecting section 7a to terminate the measurement of the transmission power of each slot after a specific period of time.

The power control request section 5a is adapted to output, to the transmitting circuit 5b, a transmission request signal corresponding to the information on the number of slots of a signal to be transmitted from the mobile terminal 11, whether to have the transmission power increase or decrease, a step size and the like. And the power control request section 5a is adapted to output a trigger signal to the slot detecting section 7a of the analyzing section 7 when outputting the transmission request signal to the transmitting circuit 5b.

In response to the transmission request signal from the power control request section 5a controlled by the control section 4, the transmitting circuit 5b is adapted to output, to the mobile terminal 11 through the directional coupler 2 and the connecting terminal 1a, control information corresponding to the transmission request signal from the power control request section 5a. In response to the control information from the transmitting circuit 5b, the mobile terminal 11 outputs a signal using the transmission power corresponding to the control information from the transmitting circuit 5b, while controlling the transmission power with respect to each slot.

The receiving circuit 6a of the receiving section 6 is adapted to receive the signal from the mobile terminal 11 through the connecting terminal 1a and the directional coupler 2, and to output the received signal to the A/D converter 6b. Additionally, the reception frequency of the receiving circuit 6a is controlled by the control section 4, and the same as the carrier frequency of the signal to be outputted by the mobile terminal 11.

The A/D converter 6b converts the signal received from the mobile terminal 11 into a digital signal, and outputs waveform data indicative of the signal from the mobile terminal 11 to the memory section 6c. In response to a start signal from the control section 4, the A/D converter 6b starts to store the waveform data in the memory section 6c, and continues to store the waveform data in the memory section 6c until receiving an end signal from the control section 4. Additionally, the memory section 6c has a writing function and a reading function, and can execute two functions independently.

The analyzing section 7 is adapted to read out the waveform data from the memory section 6c to analyze the waveform data. The analyzing section 7 is constituted by a digital signal processor, and has a slot detecting section 7a, a slot power detecting section 7b, and an analysis result memory section 7c.

The slot detecting section 7a is adapted to read out, in the first-in first-out order, waveform data from the memory section 6c in response to the trigger signal from the power control request section 5a, and to detect the number of slots from the waveform data read from the memory section 6c. Here, the horizontal axis of the waveform data is a time scale (address in the memory section), while the vertical axis of the waveform data is a voltage scale (value in the memory section). On the other hand, the horizontal axis may be a power scale based on the conversion of voltage to transmission power.

The slot power detecting section 7b is adapted to calculate power values of slots detected by the slot detecting section 7a, and adapted to calculate, as amount of change (relative quantity), the difference between a power value of each slot and a power value of a slot separated from each slot by a specified number of slots.

The analysis result memory section 7c has, as analysis results, the number of slots detected by the slot detecting section 7a, the power value calculated with respect to each slot by the slot power detecting section 7b, and the difference (ratio) between power values of slots separated from each other.

The judging section 8 is adapted to check the operation of the mobile terminal 11 through steps of comparing data stored in the power control request section 5a with data stored in the analysis result memory section 7c, and judging whether or not the mobile terminal 11 identified as a test object is functioning properly. More specifically, the judging section 8 is adapted to judge, in each of slots stored in the analysis result memory section 7c, whether or not the variation in transmission power between slots (relative quantity) is within an allowable error range based on the set step size. For example, under the condition that the set step size is 1 dB and the allowable error range is ±0.5 dB, when the different in transmission power between the relevant slot and the previous slot is 0.8 dB, the relevant slot is judged as a regular slot. When the different in transmission power between the relevant slot and the previous slot is 1.7 dB, the relevant slot is judged as an irregular slot.

The display control section 9 is adapted to produce display data necessary to display a graph showing time-series power levels related to slots and stored in the analysis result memory section 7c, and to display the graph on the display section 10. Additionally, the display control section 9 may be adapted to display the graph on the display section 10 together with the judgments made by the judging section 8 as needed basis.

FIG. 13 is a diagram showing a sequence between the signal analyzer 1 and the mobile terminal 11, the sequence explaining about the test of the above-mentioned CLPC function. The sequence will become apparent through the symbols (a) to (j) shown in FIG. 13. Additionally, in the test of the CLPC function, the signal analyzer 1 sets the step size of the mobile terminal 11 to 1 dB, 2 dB, and 3 dB in that order, and measures, with respect to each step size, the transmission power of a signal from the mobile terminal 11 when controlling the transmission power of the mobile terminal 11.

In step (a), the signal analyzer 1 performs communication with the mobile terminal 11 through the coaxial cable, establishes connection with the mobile terminal 11, and sets the step size as default. In step (b), the signal analyzer 1 instructs the mobile terminal 11 to start the test of the CLPC function. The signal analyzer 1 may conduct other test in steps (a) to (b), and may change the step size in steps (a) to (b).

In step (c), the signal analyzer 1 controls the mobile terminal 11 to set the transmission power of the mobile terminal 11 to a maximum value based on the CLPC measurement. Additionally, the step size of the mobile terminal 11 is 2 dB in step (c) of FIG. 12.

In the test of the CLPC function, the signal analyzer 1 increases the step size of the mobile terminal 11 in increments of 1 dB, 2 dB and 3 dB, and measures the transmission power of each slot with respect to each step size. Therefore, the signal analyzer 1 firstly sets the step size of the mobile terminal to 1 dB in step (d).

In step (e), the signal analyzer 1 controls the mobile terminal 11 to change the transmission power of the mobile terminal 11 from the maximum value based on the CLPC measurement to the minimum value based on the CLPC measurement in increments of 1 dB, and then change the transmission power of the mobile terminal 11 from the minimum value to the maximum value in increments of 1 dB. And the signal analyzer 1 receives a signal from the controlled mobile terminal 11, measures the transmission power of the signal with respect to each slot, and terminates the measurement of the transmission power.

In step (f), the signal analyzer 1 sets the step size of the mobile terminal 11 to 2 dB. In step (g) similar to step (e), the signal analyzer 1 controls the mobile terminal 11 to decrease the transmission power of the mobile terminal 11 from the maximum value based on the CLPC measurement to the minimum value based on the CLPC measurement in increments of 2 dB, and then increase the transmission power of the mobile terminal 11 from the minimum value to the maximum value in increments of 2 dB. And the signal analyzer 1 measures the transmission power of the signal with respect to each slot.

In step (h), the signal analyzer 1 sets the step size of the mobile terminal 11 to 3 dB. In step (i) similar to steps (e) and (g), the signal analyzer 1 controls the mobile terminal 11 to decrease the transmission power of the mobile terminal 11 from the maximum value based on the CLPC measurement to the minimum value based on the CLPC measurement in increments of 3 dB, and then increase the transmission power of the mobile terminal 11 from the minimum value to the maximum value in increments of 3 dB. And the signal analyzer 1 measures the transmission power of the signal with respect to each slot.

After terminating the measurement of the transmission power of each slot, the signal analyzer 1 displays a graph showing the transmission powers measured with respect to each slot and ordered in time in step (j).

FIG. 14 is a sequence diagram explaining in more detail about steps (e), (g), and (i) which are shown in FIG. 13, and in which the signal analyzer 1 controls the mobile terminal 11 to decrease the transmission power of the mobile terminal 11 from the maximum value based on the CLPC measurement to the minimum value based on the CLPC measurement, and then increasing the transmission power of the mobile terminal 11 from the minimum value to the maximum value. The following description is directed to steps (k) to (w).

In step (k), the mobile terminal 11 transmits a signal using the transmission power "Pue" set to the maximum value "Pmax" based on the CLPC measurement while being controlled by the signal analyzer 1. In step (i), the signal analyzer 1 requests the mobile terminal 11 to decrease the transmission power on the basis of the above mentioned TPC of the downlink. In step (m), the mobile terminal 11 decreases the transmission power by the set step size "Ps" to transmit a signal using the decreased transmission power "Pmax-Ps".

In step (n), the signal analyzer 1 requests the mobile terminal 11 to decrease the transmission power. In step (o), the mobile terminal 11 decreases the transmission power by the set step size "Ps" to transmit a signal using the decreased transmission power "Pmax-2Ps". Similarly, the mobile terminal 11 decreases the transmission power by the set step size "Ps" with respect to each of the transmission power decreasing requests from the signal analyzer 1, and transmits a signal using the decreased transmission power.

In response to the transmission power decreasing request made in step (p) by the signal analyzer 1, the mobile terminal 11 decreases the transmission power "Pue=Pmax-(n-1)Ps" by the set step size "Ps", and transmits a signal using the decreased transmission power "Pmax-nPs" in step (q). Here, the character "n" indicates a positive integer and the times of the transmission power decreasing request from the signal analyzer 1.

In step (r), the signal analyzer 1 judges whether or not the transmission power "Pue" of the mobile terminal 11 is smaller than or equal to the minimum value "Pmin" based on the CLPC measurement. As shown in FIG. 13, the signal analyzer 1 determines that "Pue=Pmax-nPs=Pmin". Although the determinations of each step size are not fully explained in FIG. 13, the signal analyzer 1 makes the determinations of each step size in steps (m) and (o).

In response to this judgment, the signal analyzer 1 requests the mobile terminal 11 to increase the transmission power of the mobile terminal 11 on the basis of the TPC of the downlink in step (s). In response to this request, the mobile terminal 11 increases the transmission power by the set step size "Ps", and transmits a signal using the increased transmission power in step (t). In this step, the increased transmission power becomes "Pmax+Ps". In the same way, the mobile terminal 11 increases the transmission power in increments of the set step size "Ps", and repeatedly transmit a signal using the increased transmission power.

In response to the request made in step (u) by the signal analyzer 1 to increase the transmission power, the mobile terminal 11 increases the transmission power by the set step size "Ps", and transmits a signal by using the increased transmission power in step (v). In this step, the transmission power "Pue" of the mobile terminal 11 is increased from "Pmax+(m-1)Ps" to "Pmax+mPs". Here, the natural number "m" indicates the number of the requests made and transmitted from the signal analyzer 1 to the mobile terminal 11 to gradually increase the transmission power.

In step (w), the signal analyzer 1 determines whether or not the transmission power "Pue" of the mobile terminal 11 is larger than or equal to the maximum value "Pmax" based on the CLPC measurement. As shown in FIG. 13, when Pue=Pmin+mPs=Pmax, the signal analyzer 1 terminates the control necessary to increase the transmission power "Pue" of the mobile terminal 11 to the maximum value from the minimum value in increments of the set step size, and to decrease the transmission power "Pue" of the mobile terminal 11 to the minimum value from the maximum value in decrements of the set step size. Although the determinations of each step size are not fully explained and omitted in FIG. 13, the signal analyzer 1 makes the above-mentioned determinations with respect to each step size in step (t).

Additionally, the number "m" is equal to the number "n" under the condition that the transmission power "Pue" of the mobile terminal 11 is changed in increments of an ideal step size as shown in FIG. 14. However, the increased or decreased transmission power of the mobile terminal 11 has a margin of error even if the transmission power "Pue" of the mobile terminal 11 is increased or decreased in decrements of the set step size.

The operation about the test of the CLPC function of the signal analyzer 1 thus constructed will be described hereinafter with reference to FIG. 15. FIG. 15 is a flow chart showing the operation of the conventional signal analyzer 1.

Firstly, the power control setting section 3 outputs, to each part of the signal analyzer 1, information necessary to carry out the test of the CLPC function through the control section 4 on the basis of the information from the power control setting section 3 (in step S1).

Then, the power control request section 5a outputs, to the transmitting circuit 5b, a control signal to control the mobile terminal 11 to set the transmission power of the mobile terminal 11 to a value larger than or equal to the maximum transmission power based on the CLPC standard. In response to the control signal from the power control request section 5a, the transmitting circuit 5b outputs control information corresponding to the control signal to the mobile terminal 11 through the directional coupler 2 and the connecting terminal 1a to set the transmission power of the mobile terminal 11 to a value larger than or equal to the maximum transmission power based on the CLPC standard (in step S2).

In response to the request from the power control request section 5a, the mobile terminal 11 sets the step size of the mobile terminal 11 to 1 dB through the transmitting circuit 5b, the directional coupler 2, and the connecting terminal 1a (in step S3).

In the same way, the power control request section 5a requests the mobile terminal 11 to transmit a signal. In response to the transmission request from the power control request section 5a, the mobile terminal 11 starts to transmit a signal using a maximum transmission power based on the CLPC standard. And the signal starts to be received from the mobile terminal 11 by the receiving circuit 6a, and converted to digital waveform data which are stored in the memory section 6c. At the same time, the slot detecting section 7a starts to reads out digital waveform data from the memory section 6c, and detects a start point of each slot on the basis of the information from the control section 4 or the power control request section 5a. The slot power detecting section 7b detects a transmission power of each slot detected by the slot detecting section 7a, and stores the transmission power of each slot in the analysis result memory section 7c (in step S4). The slot detecting section 7a, the slot power detecting section 7b, and the analysis result memory section 7c perform respective operations to immediately detect transmission powers of slots of all the waveform data stored in the memory section 6c.

The power control request section 5a requests the mobile terminal 11 to decrease the transmission power by the current step size. The mobile terminal 11 decreases the transmission power by the current step size in response to the request from the power control request section 5a, and transmits a signal using the decreased transmission power (in step S5). Additionally, the transmission power is updated with respect to each slot.

The control section 4 judges whether or not the transmission power of the mobile terminal 11 is smaller than or equal to the minimum transmission power based on the CLPC measurement standard (in step S6). When the transmission power of the mobile terminal 11 is not smaller than or equal to the minimum transmission power based on the CLPC measurement standard (S6-No), the power control request section 5a controls the mobile terminal 11 to further reduce the transmission power of the mobile terminal 11 by the current step size. When, on the other hand, the transmission power of the mobile terminal 11 is smaller than or equal to the minimum transmission power based on the CLPC measurement standard (S6-Yes), the power control request section 5a requests the mobile terminal 11 to increase the transmission power of the mobile terminal 11 by the current step size. The mobile terminal 11 increases the transmission power by the current step size in response to the request from the power control request section 5a, and transmits a signal using the decreased transmission power (in step S7).

Then, the control section 4 judges whether or not the transmission power of the mobile terminal 11 is larger than or equal to the maximum transmission power based on the CLPC measurement standard (in step S8). When the transmission power of the mobile terminal 11 is not larger than or equal to the maximum transmission power based on the CLPC measurement standard (S8-No), the control section 4 controls the mobile terminal 11 to increase the transmission power of the mobile terminal 11 by the current step size (in step S7). When, on the other hand, the transmission power of the mobile terminal 11 is larger than or equal to the maximum transmission power based on the CLPC measurement standard (S8-Yes), the control section 4 judges whether or not the measurement of the transmission power of each slot has been measured in every step size based on the CLPC measurement standard through the process of decreasing the transmission power of the mobile terminal 11 from the maximum transmission power to the minimum transmission power, and increasing the transmission power of the mobile terminal 11 from the minimum transmission power to the maximum transmission power (in step S9). When the measurements of the transmission powers is partially completed (S9-No), the power control request section 5a changes the step size of the mobile terminal 11 to the remaining step size (in step S10). When, for example, the current step size is 1 dB, the power control request section 5a changes the step size to "+2 dB" by increasing the current step size by "+1 dB".

When all the measurements of the transmission power of the mobile terminal 11 is completed with respect to each step size (S9-Yes), the memory section 6c completes the storing operation after storing all the measured transmission power of each slot, and the analysis result memory section 7c completes the storing operation after storing all the measured transmission power of each slot (in step S11). The display control section 9 reads out the transmission power of each slot from the analysis result memory section 7c, and produces display data necessary to display the transmission powers of slots ordered in time on the display section 10 (in step S12).

FIG. 16 is a graph showing an example displayed on a screen by the conventional signal analyzer. The vertical axis of the graph located in the electric power graph display section 32 is a power scale (the transmission power is measured in decibels with reference to one milliwatt (dBm), and shown without a scale). Here, the stepped graph shows the transmission powers of slots ordered in time. In FIG. 16, the reference character "Sa" indicates a section showing measurement results obtained under the condition that the transmission power of the mobile terminal 11 is decreased in increments of "1 dB". In the same way, the reference character "Sb" indicates a section showing measurement results obtained under the condition that the transmission power of the mobile terminal 11 is increased in increments of "1 dB". The reference character "Sc" indicates a section showing measurement results obtained under the condition that the transmission power of the mobile terminal 11 is decreased in increments of "2 dB". The reference character "Sd" indicates a section showing measurement results obtained under the condition that the transmission power of the mobile terminal 11 is increased in increments of "2 dB".

Actually, the step size of the mobile terminal is changed to other step size in a period of time intervening between sections "Sb" and "Sc", and further set in a period of time intervening between sections "Sd" and "Se". The display control section 9 of the signal analyzer 1 however displays measurement results corresponding to the sections without showing measurement results corresponding to those periods of time.

Although a sign indicating an irregular slot is not shown in FIG. 16, the judging section 8 of the signal analyzer 1 compares the measurement result of each slot and the reference value of the test of the CLPC function. When the judgment is made that one or more measurement results are irregular, the display control section 9 displays a sign indicating an irregular slot.

The operation check of the judging section 8 of the mobile terminal 11 is performed on the basis of, for example, reference tables shown in FIG. 17 or FIG. 18. Those reference tables shows examples of the reference values of the test of the CLPC function, and stored in a memory section (not shown). FIG. 17 is a graph showing an example of the standard table, the first row (1) corresponds to standard values to be used when the transmission power is increased by each of the step sizes 1 dB, 2 dB, and 3 dB, the second row (2) corresponds to standard values to be used when the transmission power is maintained by each of the step sizes 1 dB, 2 dB, and 3 dB, and the third row (3) corresponds to standard values to be used when the transmission power is decreased by each of the step sizes 1 dB, 2 dB, and 3 dB. Here, the reference value of FIG. 17 is indicative of the (relative quantity) difference between the transmission power of the relevant slot and the transmission power of a slot adjacent to the relevant slot.

In the standard value table shown in FIG. 18, the first row (1) shows standard values which are used when the transmission power is increased in increments of 1 dB, 2 dB, or 3 dB, the second row (2) shows standard values which are used when the transmission power is maintained in increments of 1 dB, 2 dB, or 3 dB, and the third row (3) shows standard values which are used when the transmission power is increased in increments of 1 dB, 2 dB, or 3 dB. Here, the reference value of FIG. 18 is indicative of the (relative quantity) difference between the transmission power of the relevant slot and the transmission power of a slot separated from the relevant slot by 10 slots (7 slots corresponds to 3 dB).

For details, refer to for example a patent document 1 explaining the construction of the above-mentioned signal analyzer.

Patent document 1: Japanese Patent Laid-Open Publication 2003-46431

DISCLOSURE OF THE INVENTION

Problems to be Solved by the Invention

In the above-mentioned test of the CLPC function, the quantitative change (relative quantity) indicative of the difference between a transmission power of a relevant slot and a transmission power of a slot separated from the relevant slot by a predetermined number of slots is compared with a standard value. In this case, it is important to monitor the change of the transmission power (relative quantity). However, the conventional signal analyzer is adapted to display the transmission powers of the slots ordered in time. The conventional signal analyzer is useful in allowing the user to monitor the transmission power of each slot, and not useful in allowing the user to monitor the change of the transmission power of each slot.

In the above-mentioned test of the CLPC function, the conventional signal analyzer is adapted to judge, with respect to each slot, whether or not the difference between transmission powers of slots (relative quantity) is normal, by comparing the transmission power of each slot with the reference value. Even if the conventional signal analyzer allows the user to know whether or not the each of the slots is normal, it is difficult for the user to analysis the background factor of a slot judged as an irregular slot.

It is therefore an object of the present invention to provide a signal analyzer which can allow the user to monitor a relative quantity indicative of the difference between transmission powers of slots, and to analyze, with respect to each slot, the transmission power controlled in power with respect to each slot.

Means for Solving the Problems

In order to attain the above-mentioned object, a signal analyzer operable to receive an object signal controlled in transmission power with respect to each slot, to detect a transmission power of each slot of the object signal, and to display the transmission power of each slot of the object signal on a display section (10), comprising: an analysis display control section (27, 29, 49) for calculating, with respect to each slot, a relative quantity calculated from a transmission power of a relevant slot of the object signal and a transmission power of a slot separated from the relevant slot by a predetermined number of slots, ordering in time the relative quantity calculated with respect to each slot, and displaying on the display section the relative quantity calculated with respect to each slot and ordered in time.

In the signal analyzer according to the present invention, the analysis display control section may be adapted to calculate, with respect to each slot, an error value indicative of the difference between the relative quantity of the relevant slot and a reference value of the relevant slot, to order in time the error value calculated with respect to each slot, and to display on the display section a graph showing the error value calculated with respect to each slot and ordered in time.

In the signal analyzer according to the present invention, the analysis display control section may be adapted to calculate, with respect to each slot, a difference value indicative of the difference between the relative quantity of the relevant slot and the relative quantity of a slot adjacent to the relevant slot, to order in time the difference value calculated with respect to each slot, and to display on the display section a graph showing the difference value calculated with respect to each slot and ordered in time.

The signal analyzer according to the present invention may further comprise a judging section (8, 48) for judging, with respect to each slot, whether or not the transmission power detected by the analysis display control section is normal. When the judgment is made that the transmission power of the relevant slot is not normal, the analysis display control section may be adapted to distinguish, on the graph, the relevant slot from other slots that the transmission power is normal.

The signal analyzer according to the present invention may further comprise a judging section (48) for judging, with respect to each slot, whether or not the transmission power detected by the analysis display control section is within a range. The analysis display control section may be adapted to distinguish, on the graph, a section having a slot that the transmission power is within the range, from a section having a slot that the transmission power is not within the range.

In the signal analyzer according to the present invention, the judging section may be adapted to judge, with respect to each slot, whether or not the transmission power detected by the analysis display control section is normal. When the judgment is made that the transmission power of the relevant slot is not normal, the analysis display control section may be adapted to distinguish, on the graph, the relevant slot as being different from other slots that the transmission power is normal.

In the signal analyzer according to the present invention, the analysis display control section is adapted to display on the graph a reference line necessary to judge, on the graph, whether or not the relative quantity is normal.

The signal analyzer according to the present invention may further comprise a setting operation section (23) for setting the predetermined number. The analysis display control section may be adapted to calculate the relative quantity on the basis of the predetermined number set by the setting operation section.

Advantageous Effect of Invention

The signal analyzer according to the present invention can allow the user to monitor the relative quantity with ease, and to analyze the object signal on the basis of the relative quantity with ease, by reason that the signal analyzer calculates, with respect to each slot, a relative quantity calculated from a transmission power of a relevant slot of the object signal and a transmission power of a slot separated from the relevant slot by a predetermined number of slots, orders in time the relative quantity calculated with respect to each slot, and displays on the display section the relative quantity calculated with respect to each slot and ordered in time.

The signal analyzer according to the present invention can allow the user to monitor the difference between the relative quantity and a reference value with ease, and to analyze the object signal on the basis of the difference between the relative quantity and the reference value with ease, by reason that the signal analyzer calculates, with respect to each slot, an error value indicative of the difference between the relative quantity of the relevant slot and a reference value of the relevant slot, orders in time the error value calculated with respect to each slot, and displays on the display section a graph showing the error value calculated with respect to each slot and ordered in time.

The signal analyzer according to the present invention can allow the user to monitor the changing point of the relative quantity with ease, and to analyze the object signal on the basis of the changing point of the relative quantity with ease, by reason that the signal analyzer calculates, with respect to each slot, a difference value indicative of the difference between the relative quantity of the relevant slot and the relative quantity of a slot adjacent to the relevant slot, orders in time the difference value calculated with respect to each slot, and displays on the display section a graph showing the difference value calculated with respect to each slot and ordered in time.

The signal analyzer according to the present invention can allow the user to know with ease, from the graph, whether or not the transmission power is normal with respect to each slot, by reason that the signal analyzer judges, with respect to each slot, whether or not the transmission power detected by the analysis display control section is normal, and distinguishes, on the graph, the relevant slot from other slots that the transmission power is normal.

The signal analyzer according to the present invention can allow the user to know with ease, from the graph, whether or not the transmission power is normal with respect to each slot, by reason that signal analyzer judges, with respect to each slot, whether or not the transmission power detected by the analysis display control section is normal, and distinguishes, on the graph, the relevant slot as being different from other slots that the transmission power is normal.

The signal analyzer according to the present invention can allow the user to know, as a margin, the difference between the relative quantity and the reference value, by reason that the signal analyzer displays on the graph a reference line necessary to judge, on the graph, whether or not the relative quantity is normal.

The signal analyzer according to the present invention can allow the user to set the number of slots necessary to calculate the relative quantity, and to analyze the object number, by reason that the signal analyzer calculates the relative quantity on the basis of the predetermined number.

BRIEF DESCRIPTION OF THE DRAWINGS

FIG. 17 is a graph showing an example of the CLPC measurement standard of the CDMA method.

FIG. 18 is a graph showing another example of the CLPC measurement standard of the CDMA method.

EXPLANATION OF THE REFERENCE NUMERALS

Figure 1:
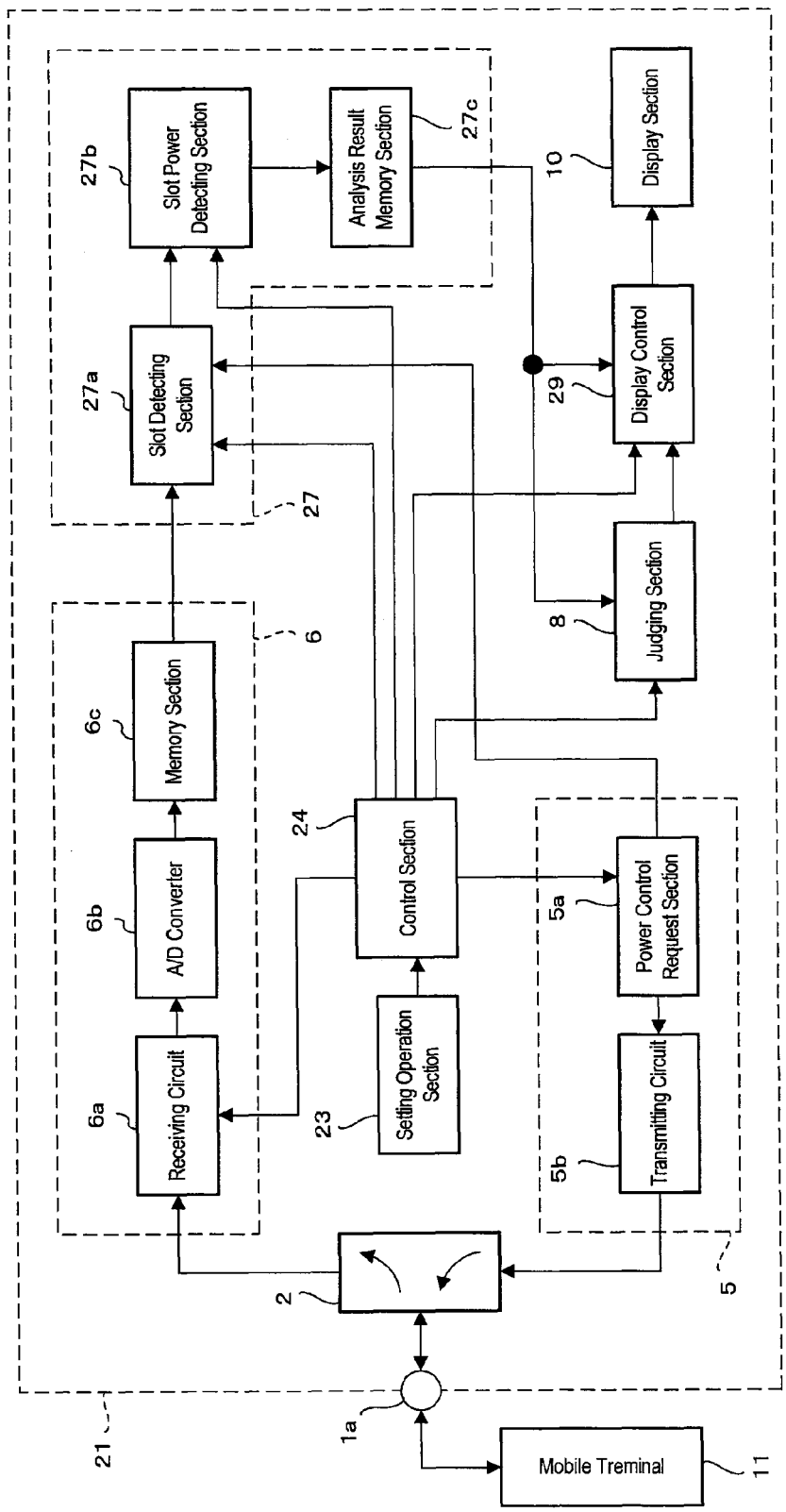
FIG. 1 is a block diagram showing the construction of the signal analyzer according to the first embodiment of the present invention.

1a: connecting terminal
2: directional coupler
3: power control setting section
5: transmitting section
5a: power control request section
6c: memory section
27: analyzing section
27a: slot detecting section
27b: slot power detecting section
27c: analysis result memory section
8: judging section
10: display section
11: mobile terminal
21: signal analyzer
23: setting operation section
24: control section
29: display control section
44: control section
48: judging section
48a: slot judging section
48b: judgment-free area judging section
31: screen
32: electric power graph display section
33: classification display section
34: relative quantity graph display section
35: difference graph display section
36: reference line
37: judgment-free area

FIRST EMBODIMENT

The first embodiment of the signal analyzer according to the present invention will be described hereinafter with reference to accompanying drawings.

FIG. 1 is a block diagram showing a construction of a signal analyzer 21 according to the first embodiment of the present invention. The constructional elements of the signal analyzer according to the first embodiment the same as those of the conventional signal analyzer 1 will be omitted from the following explanation.

The signal analyzer 21 shown in FIG. 1 comprises a connecting terminal 1a, a directional coupler 2, a setting operation section 23, a control section 24, a transmitting section 5, a receiving section 6, an analyzing section 27, a judging section 8, a display control section 29, and a display section 10. The transmitting section 5 includes a power control request section 5a and a transmitting circuit 5b, while the receiving section 6 includes a receiving circuit 6a, an analog-to-digital converter 6b, and a memory section 6c. The analyzing section 27 includes a slot detecting section 27a, a slot power detecting section 27b, and an analysis result memory section 27c. Additionally, the analyzing section 27 and the display control section 29 are collectively constituted as an analysis display control section.

Here, the connecting terminal 1a, the directional coupler 2, the transmitting section 5, the receiving section 6, the judging section 8, and the display section 10 are the same in construction as those of the conventional signal analyzer 1. Further, the power control section 5a and the transmitting circuit 5b of the transmitting section 5 are the same in construction as those of the conventional signal analyzer 1. The receiving circuit 6a, the analog-to-digital converter 6b, and the memory section 6c of the receiving section 6 are the same in construction as those of the conventional signal analyzer 1.

The setting operation section 23 has a function the same as that of the power control setting section 3 of the conventional signal analyzer 1, and is adapted to receive instructions from an operator to set a screen and to move a marker. In order to display, with respect to each slot, the relative quantity calculated from a transmission power of a relevant slot and a transmission power of a slot separated from the relevant slot by the specified number of slots, the setting operation section 23 has another function to specify the number of slots intervening between the relevant slot and a slot separated from the relevant slot. The setting operation section 23 can set the number of slots to "1" (i.e. a slot adjacent to the relevant slot) or "10", and may set the number of slots to any positive integer.

The control section 24 has a function the same as that of the control section 4 of the conventional signal analyzer 1, and is adapted to transmit, to the slot power detecting section 27b and the display control section 29, instructions and setting information received by the setting operation section 23 and measurement standard stored therein.

The analyzing section 27 includes a slot detecting section 27a, a slot power detecting section 27b, and an analysis result memory section 27c. Here, the slot detecting section 27a is the same in construction as the slot detecting section 7a of the conventional signal analyzer 1.

The slot power detecting section 27b is adapted to calculate a transmission power of each of the slots detected by the slot detecting section 27a, and to calculate, with respect to each of the slots ordered in time, a relative quantity calculated from a transmission power of the relevant slot and a transmission power of a slot separated from the relevant slot by the number of slots designated by the setting operation section 23. Initially, the number of slots is "1", (i.e. a slot adjacent to the relevant slot) when the number of slots is not set by the setting operation section 23. Additionally, the slot power detecting section 27b may be adapted to calculate, with respect to each of the slots ordered in time, a relative quantity calculated from a transmission power of the relevant slot and a transmission power of a slot separated from the relevant slot by every anticipated number of slots, without the number of slots designated by the setting operation section 23.

The slot power detecting section 27b is adapted to calculate, with respect to each slot, the difference between a relative quantity of the relevant slot and a relative quantity of a slot separated from the relevant slot by the specified number of slots. Additionally, the slot power detecting section 27b may be adapted to calculate, with respect to each of the slots ordered in time, a relative quantity calculated from a transmission power of the relevant slot and a transmission power of a slot separated from the relevant slot by every anticipated number of slots, without the number of slots designated by the setting operation section 23.

Further, the slot power detecting section 27b is adapted to calculate, with respect to each slot, an error value indicative of the difference between the relative quantity of the relevant slot and a reference value. Here, the term "reference value" is intended to indicate a value taken as the relative quantity, i.e., the step size of the mobile terminal 11. More specifically, the slot power detecting section 27b is adapted to receive the reference value from the control section 24.

The analysis result memory section 27c has, as analysis results, the number of slots a transmission power of each slot, a relative quantity of a transmission power of each slot, an error value, the difference between a relative quantity of a transmission power of the relevant slot and a relative quantity calculated from a transmission power of the relevant slot and a transmission power of a slot separated from the relevant slot.

The display control section 29 is adapted to read, from the analysis result memory section 27c, the number of slots, a transmission power of each slot, a relative quantity of a transmission power of each part of numbers, and the difference between a relative quantity of a transmission power of the relevant slot and a relative quantity calculated from a transmission power of the relevant slot and a transmission power of a slot separated from the relevant slot, to order in time, to produce, and to display, on the display section 10, data necessary to display a graph showing the number of slots, a transmission power of each slot, a relative quantity of a transmission power of each part of numbers, the difference between a relative quantity of a transmission power of the relevant slot and a relative quantity calculated from a transmission power of the relevant slot and a transmission power of a slot separated from the relevant slot. Further, the display control section 29 is adapted to display the reference values on the basis of information on the reference values from the control section 24.

Figure 2:
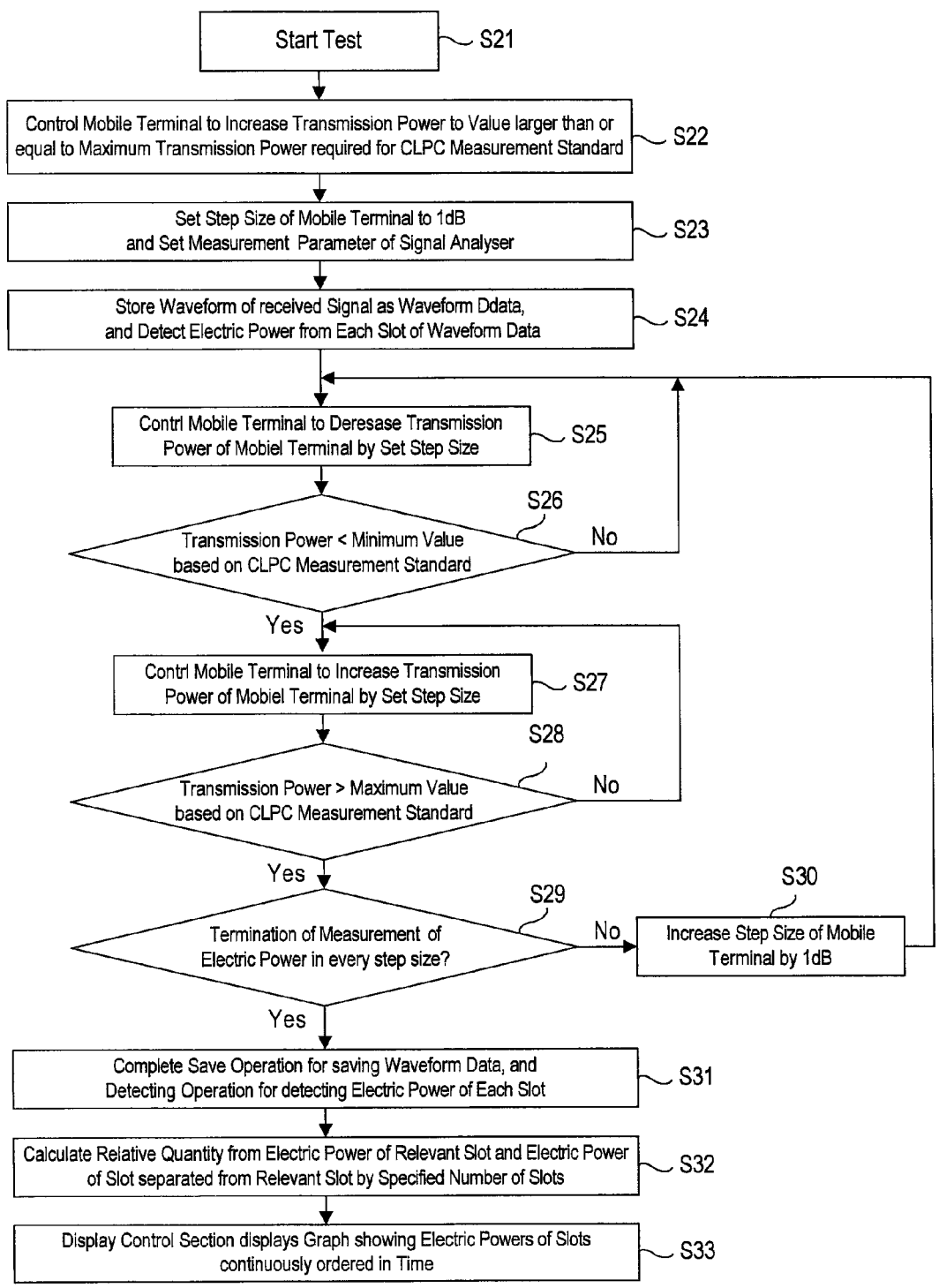
FIG. 2 is a flow chart showing the operation of the signal analyzer according to the first embodiment of the present invention.

The operation of the signal analyzer 21 thus constructed will then be described hereinafter with reference to FIG. 2. FIG. 2 is a flow chart showing part of the CLPC function test. In FIG. 2, the CLPC function test, i.e., a transmission power control test is exemplified as a test for setting the step size of the mobile terminal 11 to 1 dB, 2 dB, and 3 dB in this order, and measuring, with respect to each step size, the transmission power of the signal from the mobile terminal 11 controlled in transmission power.

Firstly, the setting operation section 23 sets, to each part of the signal analyzer 21 through the control section 24, information necessary to carry out a test of CLPC function, and starts to measure a transmission power of each slot in response to an instruction from the setting operation section 23 (in step S21).

Then, the power control request section 5a outputs, to the transmitting circuit 5b, a control signal to control the mobile terminal 11 to set the transmission power of the mobile terminal 11 to a value larger than or equal to the maximum transmission power based on the CLPC standard. In response to the control signal from the power control request section 5a, the transmitting circuit 5b outputs control information corresponding to the control signal to the mobile terminal 11 through the directional coupler 2 and the connecting terminal 1a to set the transmission power of the mobile terminal 11 to a value larger than or equal to the maximum transmission power based on the CLPC standard (in step S22).

Further, in response to the request from the power control request section 5*a*, the step size required for transmission power control of the mobile terminal 11 is set to 1 dB through the transmitting circuit 5*b*, the directional coupler 2, and the connecting terminal 1*a* (in step S23).

Then, the power control request section 5*a* requests the mobile terminal 11 to transmit a signal. In response to the transmission request from the power control request section 5*a*, the mobile terminal 11 starts to transmit a signal using a transmission power larger than or equal to the maximum transmission power based on the CLPC standard. The receiving circuit 6*a* receives the signal from the mobile terminal 11. The A/D converter 6*b* converts the received signal to a digital waveform data, and stores the digital waveform data in the memory section 6*c*. On the other hand, the slot detecting section 27*a* reads out waveform data from the memory section 6*c*, and detects a start point of each slot on the basis of information from the control section 24 or the power control request section 5*a*. The slot power detecting section 27*b* detects a transmission power of each of slots detected by the slot detecting section 7*a*, and stores the transmission power of each slot in the analysis result memory section 27*c* (in step 24). The operations of the slot detecting section 27*a*, the slot power detecting section 27*b*, the analysis result memory section 27*c* are performed until all the slots stored in the memory section 6*c*.

The power control request section 5*a* requests the mobile terminal 11 to decrease the transmission power by the current step size. The mobile terminal 11 decreases the transmission power by the current step size in response to the request from the power control request section 5*a*, and continues to transmit a signal with the decreased transmission power (in step S25). Additionally, the transmission power is updated with respect to each slot.

The control section 24 makes a judgment on whether or not the transmission power of the mobile terminal 11 is smaller than or equal to the minimum transmission power based on the CLPC measurement standard (in step S26). When the transmission power of the mobile terminal 11 is not smaller than or equal to the minimum transmission power based on the CLPC measurement standard (S26-No), the power control request section 5*a* controls the mobile terminal 11 to further reduce the transmission power of the mobile terminal 11 by the current step size. When, on the other hand, the transmission power of the mobile terminal 11 is not smaller than or equal to the minimum transmission power based on the CLPC measurement standard (S26-Yes), the power control request section 5*a* controls the mobile terminal 11 to further reduce the transmission power of the mobile terminal 11 by the current step size.

The control section 24 judges whether or not the transmission power of the mobile terminal 11 is larger than or equal to the maximum transmission power based on the CLPC measurement standard (in step S28). When the answer in step S28 is "No" (S28-No), i.e., the transmission power of the mobile terminal 11 is not larger than or equal to the maximum transmission power based on the CLPC measurement standard, the control section 24 controls the mobile terminal 11 to increase the transmission power of the mobile terminal 11 by the set step size (in step S27). When, on the other hand, the answer in step S28 is "Yes" (S28-Yes), i.e., the transmission power of the mobile terminal 11 is larger than or equal to the maximum transmission power based on the CLPC measurement standard, the control section 24 judges whether or not the transmission power of the mobile terminal 11 has been increased to the maximum transmission power, decreased to the minimum transmission power, and increased to the maximum transmission power in every step size based on the CLPC measurement standard.

When the measurements of the transmission power of each slot are partially completed (S29-No), the power control request section 5*a* changes the step size of the mobile terminal 11 to the remaining step size (in step S30). For example, if the current step size is 1 dB, the current step size is increased by 1 dB, and set to 2 dB.

When, on the other hand, the answer in step S29 is "Yes" (S29-Yes), i.e., the transmission power of the mobile terminal 11 has been measured in every step size, the control section 24 completes procedures for storing the waveform data in the memory section 6*c*, and storing the transmission power of each of the detected slots in the analysis result memory section 27*c* (in step S31).

The slot power detecting section 27*b* of the analyzing section 27 calculates the relative quantity from the transmission power of the relevant slot and the transmission power of a slot separated from the relevant slot by the predetermined number of slots, and stores the relative quantity in the analysis result memory section 27*c* (in step S32). Further, the slot power detecting section 27*b* calculates the difference between relative quantities of transmission powers.

Then, the display control section 29 reads out relative quantities from the analysis result memory section 27*c*, produces data necessary to display relative the quantities ordered in time, and displays the data on the display section 10 (in step S33). Additionally the user can operate the setting operation section 23 to change the combination of the transmission power of each slot, the relative quantity of the transmission power of each slot, and the difference between relative quantities.

Additionally, the user can change the number of slots before the test is conducted, and change the number of slots after relative quantity graph is displayed. In this case, the slot power detecting section 27*b* reads out the transmission power of each slot from the analysis result memory section 27*c*, and recalculates the relative quantity from the transmission power of each slot and the designated number of slots, while the display control section 29 displays the recalculated relative quantity on the display section 10.

Figure 3:
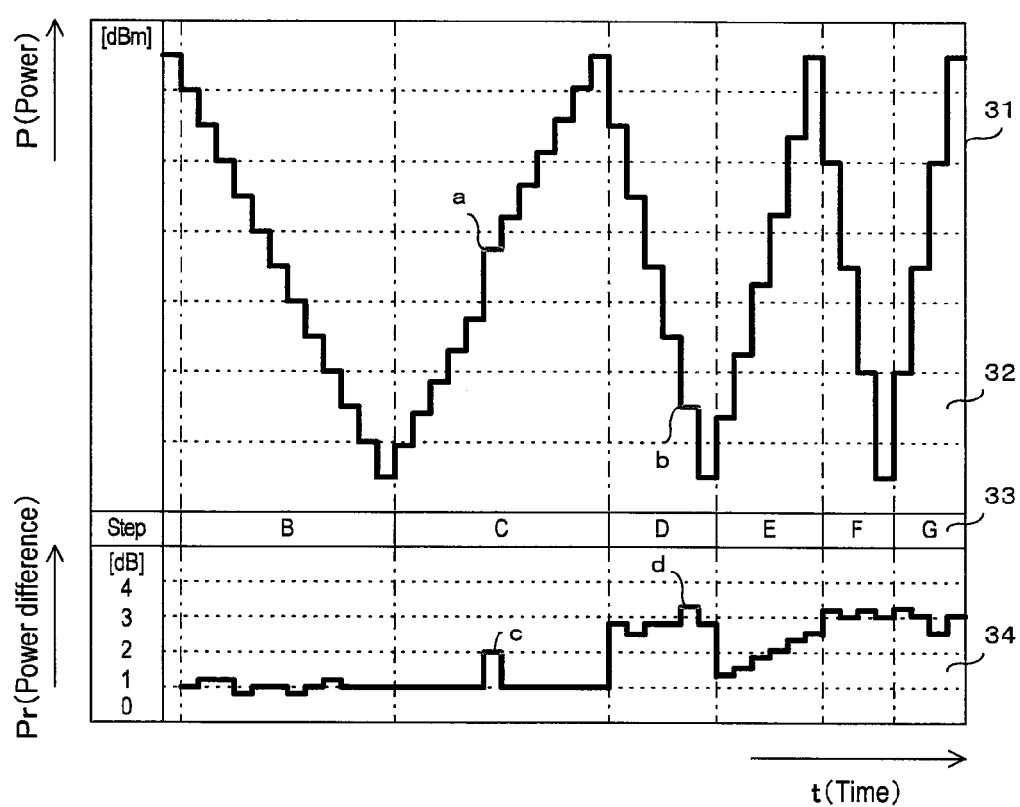
FIG. 3 is a graph showing an example displayed on a screen by the signal analyzer according to the first embodiment of the present invention.

FIG. 3 is an example of analysis results displayed on the display section 10 of the signal analyzer 21. On one screen, a graph shows transmission powers of slots and relative quantities corresponding to transmission powers of those slots. An electric power graph display section 32, a classification display section 33, and a relative quantity graph display section 34 are on the screen 31.

The vertical axis of the graph located in the electric power graph display section 32 is a power scale (the transmission power is usually measured in decibels with reference to one milliwatt (dBm), while the horizontal axis of the electric power graph display section 32 is a time scale. Additionally, the horizontal axis of the electric power graph display section 32 may be a scale related to the number of slots in place of the time scale. This graph shows transmission powers corresponding to slots continuously ordered in time.

The classification display section 33 shows the classification of each step to ensure that the user checks the classification of each of the measurement results classified into steps. The steps "B" to "G" based on the CLPC measurement standard are displayed on the classification display section 33. In step "B", the transmission power of the mobile terminal 11 is decreased in decrements of 1 dB. In step "C", the transmission power of the mobile terminal 11 is increased in increments of 1 dB. In step "D", the transmission power of the mobile terminal 11 is decreased in decrements of 2 dB. In step "E", the transmission power of the mobile terminal 11 is increased in increments of 2 dB. In step "F", the transmission power of the mobile terminal 11 is decreased in decrements of 3 dB. In step "G", the transmission power of the mobile terminal 11 is increased in increments of 3 dB. The classification of each step is displayed in connection with the measurement results displayed on the electric power graph display section 32.

The vertical axis of the graph located in the relative quantity graph section 34 is an electric power difference scale (the electric power difference is measured in decibels (dB)), while the horizontal axis is a time scale. The stepped graph shows the relative quantity of the electronic power of each of slots continuously ordered in time as measurement results. The vertical axis is shared with the electric power graph display section 32. Therefore, the user can compare, with ease, the electric power graph display section 32 with the relative quantity graph section 34. In this example, the number of slots is set to "1" which indicates an adjacent slot. The graph shows a relative quantity calculated from a transmission power of the relevant slot and a transmission power of a previous slot.

Additionally, the positive relative quantity is selected and displayed on the screen. And more specifically, the positive relative quantity is calculated from the decreasing transmission power of the mobile terminal 11 (in steps "B", "D", and "F") under the condition that the difference between transmission powers of two slots is calculated and multiplied by "−1". On the other hand, the positive relative quantity is calculated from the increasing transmission power of the mobile terminal 11 (in steps "C", "E", and "G") under the condition that the difference between transmission powers of two slots is calculated and multiplied by "1" (without changing its sign). Therefore, the positive relative quantity is selected and displayed on the screen. The relative quantity graph display section 34 on the screen 31 becomes reduced in size in comparison with a state in which positive and negative relative quantities are selectively displayed on the screen.

When the set step size of the mobile terminal 11 is 1 dB in steps "B" and "C" of FIG. 3, it is expected that the relative quantity graph section 34 will show relative quantities aligned with a line corresponding to 1 dB in steps "B" and "C" under the condition that the transmission power of the mobile terminal 11 is controlled with accuracy. In fact, the relative quantity graph section 34 may show relative quantities strongly disturbed at a point "c" as shown in FIG. 3. From the foregoing description, it will be understood that the user can check easily that an error affecting the transmission power of the mobile terminal 11 is caused at a point "c". Here, the point "c" indicated in the relative quantity graph section 34 corresponds to a point "a" on the time axis of the electric power graph display section 32.

In the same manner, the set step size of the mobile terminal 11 is 2 dB in steps "D" and "E" of FIG. 3, and it is ideally expected that the relative quantity graph section 34 will show relative quantities aligned with a line corresponding to 2 dB in steps "B" and "C" under the condition that the transmission power of the mobile terminal 11 is controlled with accuracy. From the foregoing description, it will be understood that the user can know a tendency of the relative quantities to be drastically deviated from a line corresponding to 2 dB in steps "D". Further, the relative quantities exceed 3 dB at a point "d". Here, the point "d" indicated in the relative quantity graph section 34 corresponds to a point "b" on the time axis of the electric power graph display section 32.

Further, the relative quantity graph section 34 shows relative quantities gradually increasing with time (upward-sloping relative quantities) in step "E". From the foregoing description, it will be understood that the user can partially or completely check a tendency of the relative quantities shown by the relative quantity graph section 34.

In the same manner, the step size of the mobile terminal 11 is set to 3 dB in steps "F" and "G". The relative quantity graph display section 34 shows relative quantities close to 3 dB in steps "F" and "G".

Additionally, the above-mentioned characters "a" to "d" indicate slots judged as irregular slots by the judging section 8, and changed in color from other regular slots as shown in FIG. 3. Further, two or more relative quantity graphs may be displayed on the relative quantity graph section 34. For example, the relative quantity graphs on the relative quantity graph section 34 shows, with respect to each slot, a relative quantity calculated from a transmission power of the relevant slot and a transmission power of a slot adjacent to the relevant slot, and a relative quantity calculated from a transmission power of the relevant slot and a transmission power of a previous slot separated from the relevant slot by ten slots.

Figure 4:
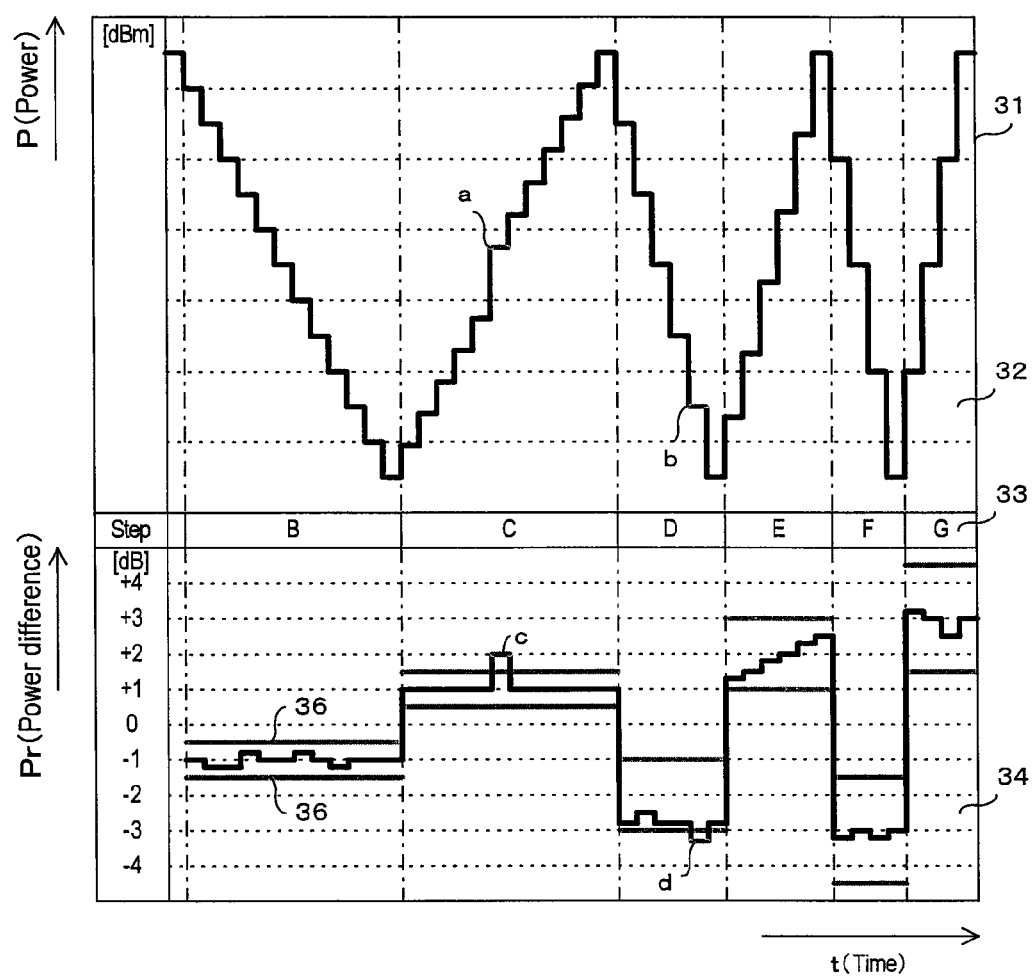
FIG. 4 is a graph showing another example displayed on a screen by the signal analyzer according to the first embodiment of the present invention.

FIG. 4 is a graph showing another example of the analysis results displayed on a screen. In FIG. 4, the screen 31 has an electric power graph display section 32, a classification display section 33 and a relative quantity graph section 34 displayed thereon. In this example, the number of slots indicating a distance between two slots is set to the positive integer "1", and the same as that of FIG. 3. The relative quantity graph section 34 shows, with respect to each slot, a relative quantity calculated from a transmission power of the relevant slot and a transmission power of a previous slot adjacent to the relevant slot. Here, the example of FIG. 4 differs from that of FIG. 3 in that positive and negative relative quantities are calculated, and shown in the relative quantity graph section 34.

Further, the relative quantity graph section 34 shown in FIG. 4 has reference lines 36 indicative of standard values necessary to judge whether or not each of the relative quantities is normal, and the same as the standard values shown in FIG. 17. The standard values 36 shown in FIG. 17 is constituted by upper and lower limit values defined with respect to each step, "B" to "G". Additionally, the user may set, through the setting operation section 23, any standard values to be displayed as reference lines 36.

The relative quantity graph section 34 has two reference lines 36 including an upper limit "−0.5 dB" and a lower limit "−1.5 dB" in step "B". As will be seen from the relative quantity graph, the relative quantities in step "B" have some margin of error, but they are within a range based on the upper and lower limits, and all the slots in step "B" are normal.

The relative quantity graph section 34 further has two reference lines 36 including an upper limit "1.5" and a lower limit "0.5 dB" in step "C". As will be seen from the relative quantity graph, one of the relative quantities in step "C" exceeds the upper limit "1.5" at a point "c", and is abnormal. The relative quantities of the remaining slots are stable at a transmission power difference of 1.0 dB, and within a range based on the upper and lower limits. Therefore, it is estimated that the above abnormal relative quantity at a point "c" in step "C" occurs in an unexpected fashion.

Similarly, the relative quantity graph section 34 further has two reference lines 36 including an upper limit "−1.0 dB" and a lower limit "−3.0 dB" in step "D", and shows relative quantities which are in the vicinity of the lower limit "−3.0 dB" in step "D". Further, one of the relative quantities exceeds 3.0 dB at a point "d", and identified as being abnormal. From the foregoing description, it will be understood that the user can know a general tendency from the difference between the relative quantities and the lower reference line, which is very small in step "D". From the relative quantity graph section 34, it is estimated that the cause of the abnormal relative quantity calculated at a point "c" results from the tendency.

Similarly, the relative quantity graph section 34 further has two reference lines 36 including an upper limit "3.0 dB" and a lower limit "−1.0 dB" in step "E". The relative quantity is within the reference lines, and judged as a regular slot. The user can monitor an irregular trend that the relative quantity is gradually increased with time (in a right direction).

Similarly, the relative quantity graph section 34 further has two reference lines 36 indicating an upper limit "−1.5 dB" and a lower limit "−4.5 dB" in step "F". Similarly, the relative quantity graph section 34 further has two reference lines 36 indicating an upper limit "4.5 dB" and a lower limit "1.5 dB" in step "G". From the relative quantity graph section 34, it is understood that the relative quantities are within a range based on the upper and lower limits, and all the slots in steps "F" and "G" are normal.

The reference lines 36 thus displayed on the relative quantity graph section 34 are useful in analyzing an object signal. Additionally, slots indicated by points "a" to "d" of FIG. 4 are judged as irregular slots, and different in color from other slots on the graph.

Additionally, in order to attain an advantageous effect the same as that attained by the reference lines, slots judged as a regular area on the basis of the reference values and slots judged as an irregular area on the basis of the reference values may be distinctly displayed on the relative quantity graph section 34 in place of the reference lines of FIG. 4. More specifically, for example, an area between "−0.5 dB" and "−1.5 dB" is indicated in blue, and an area larger than "−0.5 dB" and an area smaller than "−1.5 dB" are indicated in yellow in step "B" of the relative quantity graph section 34. An area between "0.5 dB" and "1.5 dB" is indicated in blue, and an area smaller than "0.5 dB" and an area larger than "1.5 dB" are indicated in yellow in step "C" of the relative quantity graph section 34. And areas indicated in color on the basis of the reference values in steps "D" to "G".

Figure 5:
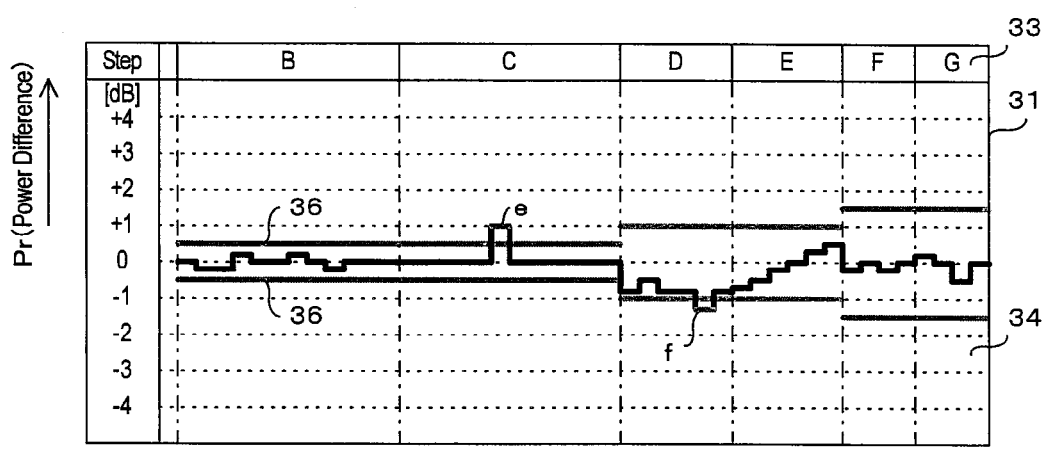
FIG. 5 is a graph showing further example displayed on a screen by the signal analyzer according to the first embodiment of the present invention.

FIG. 5 is a graph showing further example displayed on a screen by the signal analyzer according to the first embodiment of the present invention. The classification display section 33 and the relative quantity graph display section 34 are displayed on the screen 31 of FIG. 5. In this example, the number of slots is set to "1", and the same as that of FIG. 4. The graph of the relative quantity graph display section 34 shows, as an error value graph, an error values calculated and continuously ordered in time through step of subtracting the reference value from the relative quantity.

Here, the previously-determined reference value is defined as a value to be taken by an ideal relative quantity. In FIG. 5, the reference values are determined on the basis the set step size and a control state in which the transmission power is increased/decreased. In step "B", the reference value is set to "−1". In step "C", the reference value is set to "1". In step "D", the reference value is set to "−2". In step "E", the reference value is set to "2". In step "F", the reference value is set to "−3". And in step "G", the reference value is set to In FIG. 5, the relative quantity graph display section 34 further has reference lines 36 calculated through step of subtracting the standard value from the reference value. For example, "0.5 dB" and "−0.5 dB" are calculated in step "B" as reference lines 36 through step of subtracting "−1.0" from each of the upper limit "−0.5 dB" and the lower limit "−1.5 dB".

Additionally, points "e" and "f" of FIG. 5 are indicated as irregular slots, colored and different in color from other regular slots.

In this example, slots of points "e" and "f" of FIG. 5 are judged as irregular slots, a slot of point "e" is judged as an unexpected irregular slot, a margin of the reference line is generally small in step "D". The user can estimate that an irregular slot of step "f" is caused by irregular stepped slots, and monitor stepped and gradually-increasing slots in step "E".

Additionally, from the comparison of the relative quantity graph display section 34 of FIG. 4 and the relative quantity graph display section 34 of FIG. 5, it is obvious that the graph is generally reduced in a direction of the relative quantity (in a direction of the longitudinal axis of FIG. 5). The user can operate the signal analyzer to reduce or increase the area of the relative quantity graph display section 34 to enhance its resolution or the like with ease.

Figure 6:
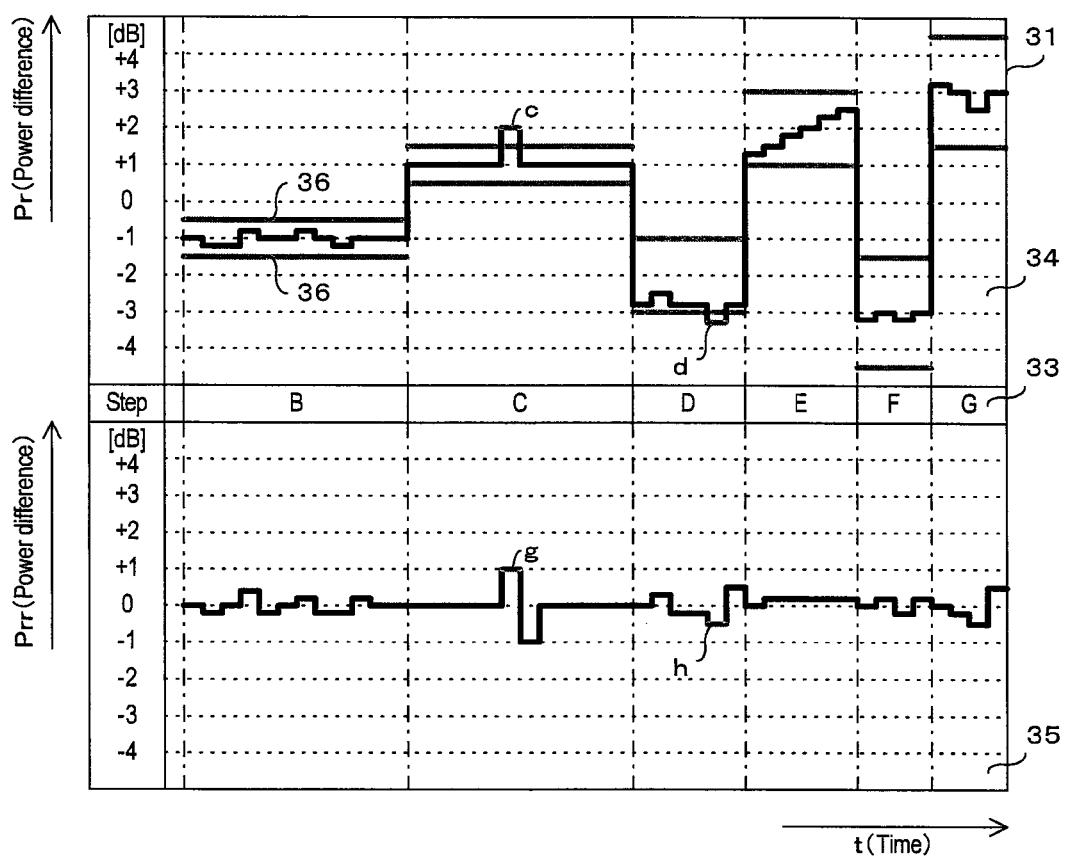
FIG. 6 is a graph showing yet further example displayed on a screen by the signal analyzer according to the first embodiment of the present invention.

FIG. 6 is a graph showing yet further example displayed on a screen by the signal analyzer according to the first embodiment of the present invention. The classification display section 33, the relative quantity graph display section 34, and the difference graph display section 35 may be displayed on the screen 31 of FIG. 6. In this example, the number of slots is set to "1" and the same as that of FIG. 4. The relative quantity is, with respect to each slot, calculated from the transmission power of the relevant slot and the transmission power of a slot just before the relevant slot, and displayed on the relative quantity graph display section 34. The difference between two relative quantities is, with respect to each slot, calculated from the relative quantity of the relevant slot and the relative quantity of a slot just before the relevant slot, and displayed on the difference graph display section 35.

A calculating method of calculating the difference between relative quantities will then be described hereinafter. The difference between relative quantities is displayed on the difference graph display section 35. In FIG. 6, a slot of point "c" of the relative quantity graph display section 34 is the same as that of point "g" of the difference graph display section 35. From the difference between a relative quantity "+2.0" obtained from a slot of point "c" and a relative quantity "+1.0" obtained from a slot just before the slot of point "c", the difference between relative quantities "2.0−1.0=1.0 dB" is calculated at the slot of point "g". In the same way, from the difference between a relative quantity "2.0" obtained from a slot of point "c" and a relative quantity "+1.0" obtained from a slot just after the slot of point "c", the difference between relative quantities "1.0−2.0=−1.0 dB" is calculated at a slot just after the slot of point "g". On the basis of the above-mentioned calculating method, the difference between relative quantities is calculated with respect to each slot, a graph showing the difference between relative quantities is displayed. In FIG. 6, the difference between relative quantities is conveniently calculated as "0 dB" at a start point of each step "C" to "G".

Additionally, points "c" and "g" correspond to each other on the vertical axis of FIG. 6, and points "d" and "h" correspond to each other on the vertical axis of FIG. 6. Each of the slots of points "c" and "g" and the slot of points "d" and "h" are judged as an irregular slot, colored, and different in color from other regular slots.

From the foregoing description, it will be understood that the calculation of the difference between relative quantities is equal to the differential calculation of original values. In short, differential values are calculated from the differential calculation of original values, and a graph show the differential values. As a result, the user can catch changing points with ease.

One example of the signal analyzer has been explained with reference to FIGS. 3 to 6. Here, contents to be displayed on the screen 31 may be properly combined by the user. For example, any one of the electric power graph display section 32, the relative quantity graph display section 34, and the difference graph display section 35 may be displayed on one screen 31. Two of those sections may be combined and displayed on one screen 31. All of those sections may be displayed side-by-side on one screen 31. The user can select one or more sections through the setting operation section 23 to instruct on how to combine and locate sections to be displayed on the screen 31.

SECOND EMBODIMENT

The second embodiment of the signal analyzer according to the present invention will be described hereinafter with reference to accompanying drawings.

Figure 7:
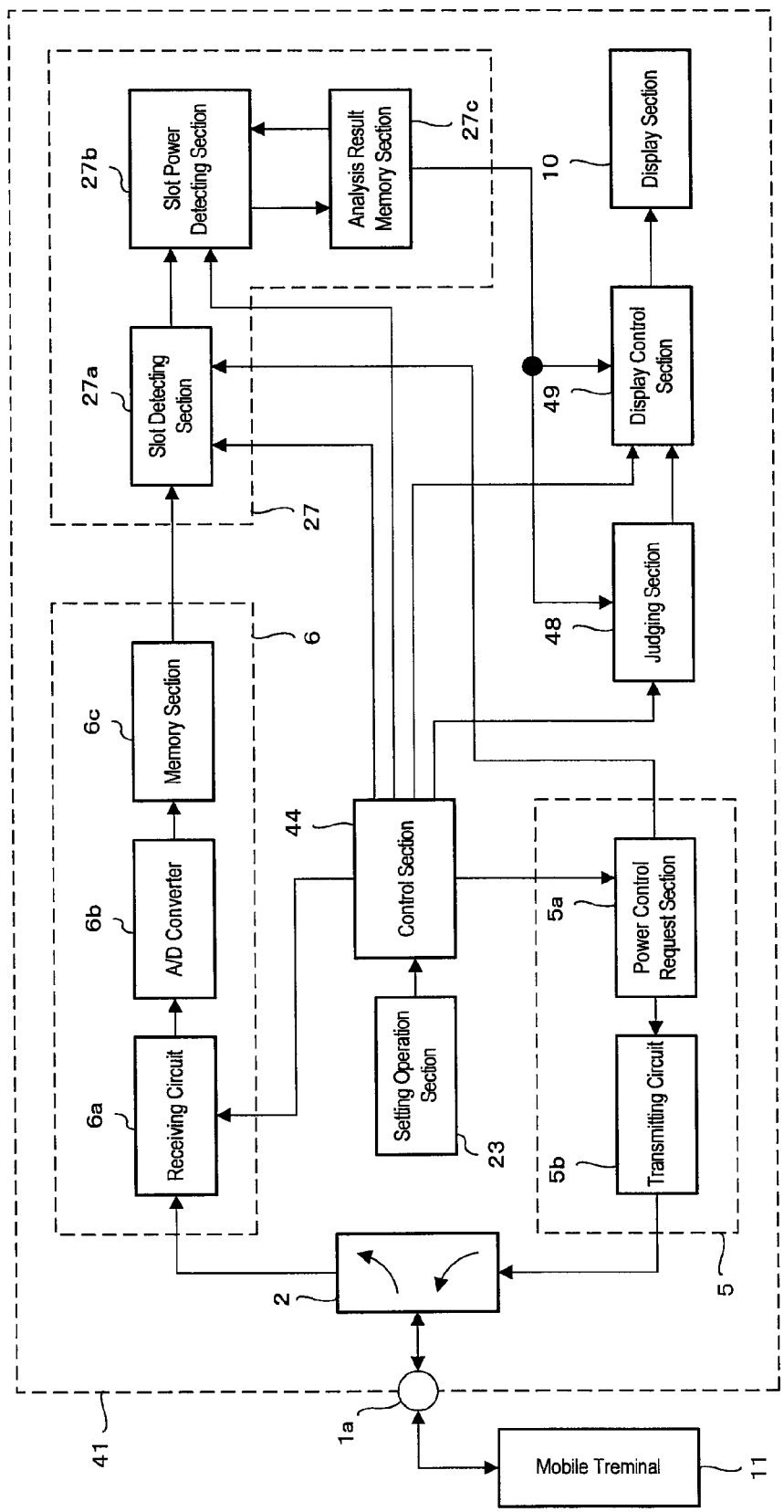
FIG. 7 is a block diagram showing the construction of the signal analyzer according to the second embodiment of the present invention.

FIG. 7 is a block diagram showing the constriction of the signal analyzer 41 according to the second embodiment of the present invention. The constitutional elements of the signal analyzer 41 according to the second embodiment the same as those of the signal analyzer 21 according to the first embodiment will be omitted from the following explanation and bear the same reference numbers as those of the signal analyzer 21 according to the first embodiment. In the signal analyzer 41, the analyzing section 27 functions as an analysis display control section with a display control section 49 which will be described hereinafter.

The control section 44 has functions the same as those of the control section 24 of the signal analyzer 21 according to the first embodiment, and has a memory section (not shown) having stored therein information on the number of times the transmission power is increased, and the number of times the transmission power is decreased, each of which is determined with respect to each step size.

Here, the number of times the transmission power of the mobile terminal 11 is increased to the maximum power from the minimum power in increments of the set step size, and the number of times the transmission power is decreased to the minimum power from the maximum power in increments of the set step size will be described hereinafter, and are estimated through steps of dividing the difference between the maximum and minimum powers based on the CLPC measurement standard by the set step size. When, for example, the difference between the maximum and minimum powers is 73 dB and the set step size is 1 dB, the number of times is 73. When the difference between the maximum and minimum powers is 73 dB and the set step size is 2 dB, the number of times is 37. The number of times necessary to increase or decrease the transmission power has margin determined, with respect to each step size, on the basis of an error or the like.

From the following description, it will be understood that the control section 44 controls, on the basis of the number of times necessary to decrease the transmission power, the mobile terminal 11 to decrease the transmission power of the mobile terminal 11 from a value larger than or equal to the maximum transmission power based on the CLPC measurement, and controls, on the basis of the number of times necessary to increase the transmission power, the mobile terminal 11 to increase the transmission power of the mobile terminal 11 from a value smaller than or equal to the minimum transmission power based on the CLPC measurement. Unless an irregular operation, the transmission power of the mobile terminal 11 can be controlled and fluctuated between the maximum and minimum transmission powers. And the control section 44 is not needed to judge, as has been described in the first embodiment, whether or not the transmission power is larger than or equal to the maximum transmission power based on the CLPC measurement standard, and whether or not the transmission power is smaller than or equal to the minimum transmission power based on the CLPC measurement standard.

Additionally, because of the above-mentioned margin of error, it is possible to have the mobile terminal 11 continue to decrease the transmission power after decreasing the transmission power to a value smaller than or equal to the minimum transmission power based on the CLPC measurement standard, or continue to increase the transmission power after increasing the transmission power to a value larger than or equal to the maximum transmission power based on the CLPC measurement standard. The CLPC measurement standard specifies that, regarding measurement data to be obtained under the condition that the mobile terminal 11 is in this state, it is not necessary to judge whether or not the transmission power of the relevant slot is normal. Physically, the mobile terminal 11 can transmit a signal using a power larger than the maximum transmission power based on the CLPC measurement standard, and using a power smaller than the minimum transmission power based on the CLPC measurement standard.

Figure 8:
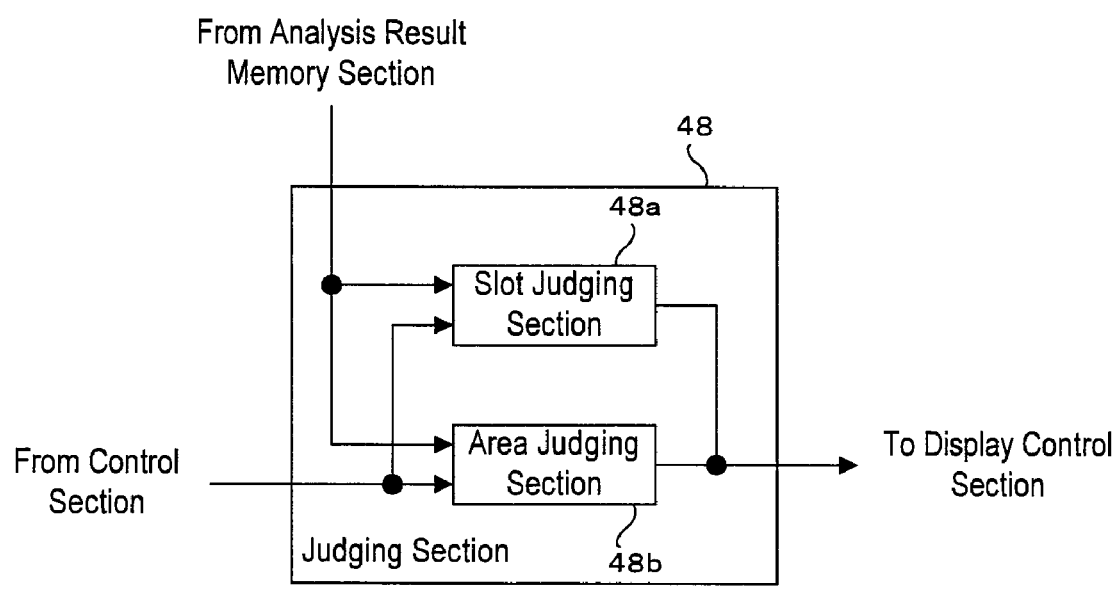
FIG. 8 is a block diagram showing the construction of essential part of the signal analyzer according to the second embodiment of the present invention.

FIG. 8 is a block diagram showing the construction of a judging section 48 of the signal analyzer according to the second embodiment of the present invention. The judging section 48 includes a slot judging section 48a and a judgment-free area judging section 48b.

The slot judging section 48a is adapted to compare information stored in the control section 44 with information stored in the analysis result memory section 27c, to judge whether or not the transmission function of the mobile terminal 11 identified as a test object is normal, and to check the operation of the mobile terminal 11 on the basis of the judgment. More specifically, the slot judging section 48a is adapted to judge, with respect to each of the slots stored in the analysis result memory section 27c, whether or not the difference (relative quantity) between transmission powers of slots is within an allowable range, and to inform the display control section 49 of this judgment.

The judgment-free area judging section 48b is adapted to read out, with respect to each slot, the transmission power value stored in the analysis result memory section 27c, to compare the power of each slot with the maximum/minimum transmission power based on the CLPC measurement standard, to detect a slot in which the transmission power is larger than the maximum transmission power based on the CLPC measurement standard, and a slot in which the transmission power is smaller than the minimum transmission power based on the CLPC measurement standard. Further, the judgment-free area judging section 48b is adapted to detect, on the basis of this detection, a judgment-free area in which it is not necessary to judge whether or not the transmission power of the relevant slot is normal, and to inform the display control section 49 about this results. For example, the information to be received by the display control section 49 indicates that the m-th to n-th slots are included in a judgment-free section.

As shown in FIG. 7, the display control section 49 is adapted to read out a transmission power of each slot, a relative quantity of a transmission power of each slot, an error value, and the difference between relative quantities, to order in time the transmission power, the relative quantity, and the difference between relative quantities to produce data necessary to display a graph, and to output the data to the display section 10. Further, the display control section 49 is adapted to visually distinguish, on the screen, each slot judged as an irregular slot from other normal slots.

Figure 9:
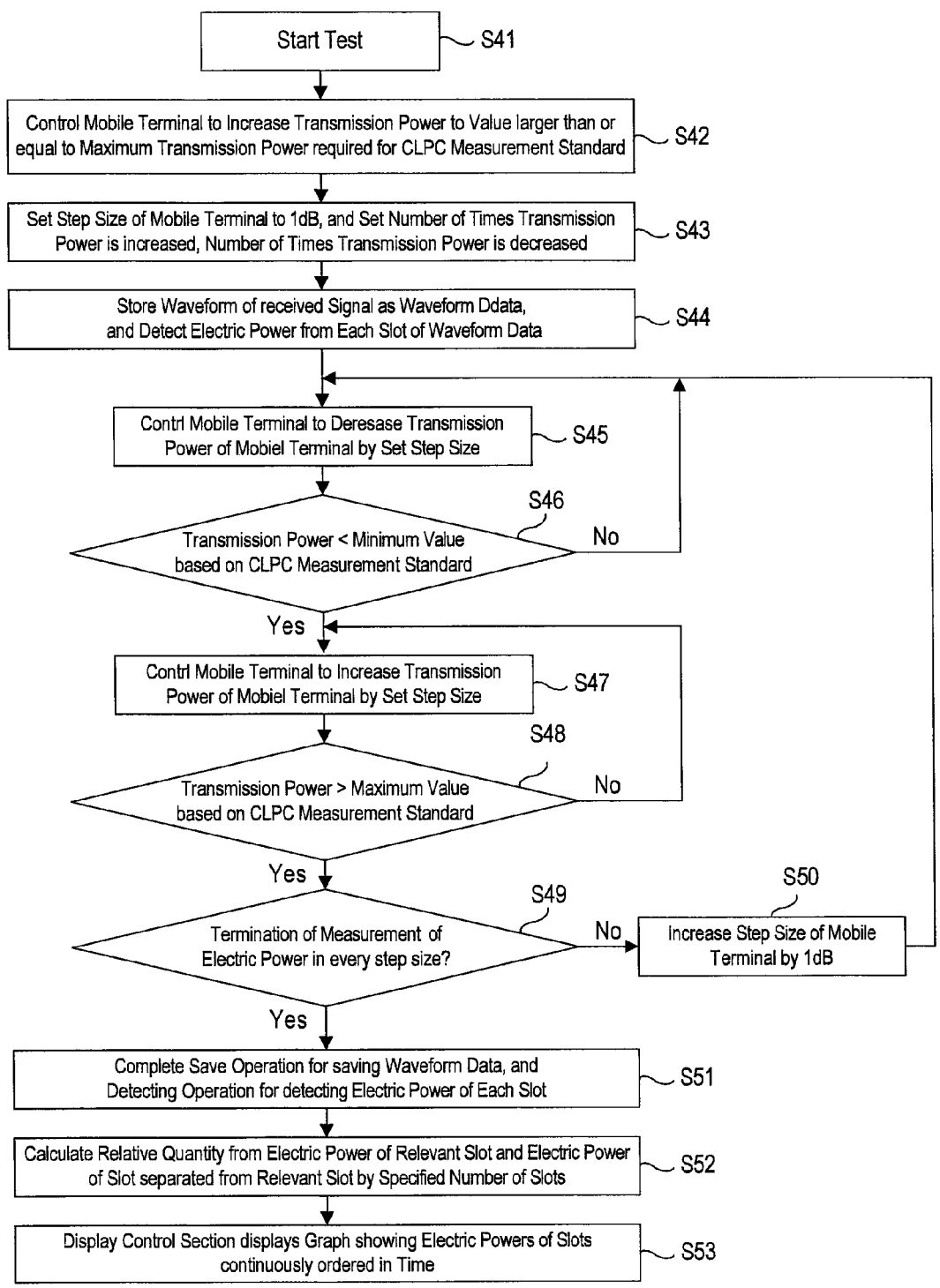
FIG. 9 is a flow chart showing the operation of the signal analyzer according to the second embodiment of the present invention.

The operation of the signal analyzer 41 thus constructed will then be described hereinafter with reference to FIG. 9. FIG. 9 is a flow chart explaining part of the test of the CLPC function. In this embodiment, the test of the CLPC function, i.e., the test of the transmission power control is exemplified as a test of setting the step size of mobile terminal 11 to 1 dB, 2 dB, and 3 dB, and controlling the transmission power of the mobile terminal 11 with respect to each step size, and measuring the power value of the transmission signal from the mobile terminal 11.

Firstly, the setting operation section 23 outputs, to each part of the signal analyzer 41 through the control section 44, setting information necessary to carry out a test of LCPC function. In response to an instruction from the setting operation section 23, the signal analyzer 41 starts to measure a transmission power of each slot (in step S41).

Then, the power control request section 5*a* outputs, to the transmitting circuit 5*b*, a control signal to control the mobile terminal 11 to set the transmission power of the mobile terminal 11 to a value larger than or equal to the maximum transmission power based on the CLPC standard. In response to the control signal from the power control request section 5*a*, the transmitting circuit 5*b* outputs control information corresponding to the control signal to the mobile terminal 11 through the directional coupler 2 and the connecting terminal 1*a* to set the transmission power of the mobile terminal 11 to a value larger than or equal to the maximum transmission power based on the CLPC standard (in step S42).

In response to the request from the power control request section 5*a*, the mobile terminal 11 sets the step size of the mobile terminal 11 to 1 dB through the transmitting circuit 5*b*, the directional coupler 2, and the connecting terminal 1*a*. The control section 44 reads out the number of times necessary to increase or decrease the transmission power from a memory section (not shown), and has the number of times stored therein (in step S43).

In the same way, the power control request section 5*a* requests the mobile terminal 11 to transmit a signal. In response to the transmission request from the power control request section 5*a*, the mobile terminal 11 starts to transmit a signal using a transmission power larger than or equal to a maximum transmission power based on the CLPC standard. And the signal is received from the mobile terminal 11 by the receiving circuit 6*a*. The signal received by the receiving circuit 6*a* is converted to digital waveform data to be stored in the memory section 6*c*. At the same time, the slot detecting section 27*a* starts to reads out digital waveform data from the memory section 6*c*, and detects a start point of each slot on the basis of information from the control section 4 or the power control request section 5*a*. The slot power detecting section 27*b* detects a transmission power of each slot detected by the slot detecting section 27*a*, and stores the transmission power of each slot in the analysis result memory section 27*c* (in step S44). The slot detecting section 27*a*, the slot power detecting section 27*b*, and the analysis result memory section 27*c* continue to functions until completing the calculation of a transmission power of each slot from all the waveform data stored in the memory section 6*c*.

The power control request section 5*a* requests the mobile terminal 11 to decrease the transmission power by the current step size. The mobile terminal 11 decreases the transmission power by the current step size in response to the request from the power control request section 5*a*, and transmits a signal using the decreased transmission power (in step S45). Here, the transmission power is updated with respect to each slot, and the control section 44 counts the number of times requests to decrease the transmission power have been outputted.

The control section 44 judges whether or not the transmission power of the mobile terminal 11 is smaller than or equal to the minimum transmission power based on the CLPC measurement standard (in step S46). When the transmission power of the mobile terminal 11 is not smaller than or equal to the minimum transmission power based on the CLPC measurement standard (S46-No), the power control request section 5*a* controls the mobile terminal 11 to further reduce the transmission power of the mobile terminal 11 by the current step size. When, on the other hand, the transmission power of the mobile terminal 11 is smaller than or equal to the minimum transmission power based on the CLPC measurement standard (S46-Yes), the power control request section 5*a* requests the mobile terminal 11 to increase the transmission power of the mobile terminal 11 by the current step size. The mobile terminal 11 increases the transmission power by the current step size in response to the request from the power control request section 5*a*, and transmits a signal using the increased transmission power (in step S47). Additionally, the control section 44 counts the number of times requests to increase the transmission power have been outputted.

Then, the control section 44 judges whether or not the number of times is equal to a predetermined value (in step S48). When the number of times is not equal to a predetermined value (S48-No), the control section 44 controls the mobile terminal 11 to increase the transmission power of the mobile terminal 11 by the current step size (in step S47). When, on the other hand, the answer in step S48 is "Yes" (S48-Yes), i.e., the transmission power of the mobile terminal 11 is larger than or equal to the maximum transmission power based on the CLPC measurement standard, the control section 44 judges whether or not the transmission power of the mobile terminal 11 has been increased to the maximum transmission power, decreased to the minimum transmission power, and increased to the maximum transmission power in every step size based on the CLPC measurement standard (in step S50).

When the measurements of the transmission power of the mobile terminal 11 are partially completed (S49-No), the power control request section 5*a* changes the step size of the mobile terminal 11 to the remaining step size. For example, if the current step size is "1 dB", the current step size is increased by "1 dB", and set to "2 dB". The control section 44 reads out the number of times the transmission power is decreased, each of which is determined with respect to each step size (in step S50).

When all the measurements of the transmission power of the mobile terminal 11 are completed with respect to each step size (S49-Yes), the memory section 6*c* completes the storing operation after storing all the measured transmission power of each slot, and the analysis result memory section 27*c* completes the storing operation after storing all the measured transmission power of each slot (in step S51).

The slot power detecting section 27*b* of the analyzing section 27 calculates the relative quantity from the transmission power of the relevant slot and the transmission power of a slot separated from the relevant slot by the predetermined number of slots, and stores the calculated relative quantity in the analysis result memory section 27*c* (in step S52). Further, the slot power detecting section 27*b* calculates the difference between relative quantities of transmission powers.

The judgment-free area judging section 48*b* of the judging section 48 reads out the transmission power of each slot from the analysis result memory section 27c, compares the transmission power of each slot with the reference value based on the CLPC measurement standard, detects a judgment-free area, and informs the display control section 49 about the detected judgment-free area (in step S53).

The display control section 49 reads out the relative quantity of each slot from the analysis result memory section 27c, and produces display data necessary to display relative qualities corresponding to slots ordered in time. Further, the display control section 49 visually distinguishes the judgment-free area from other areas in a graph to be displayed on the display section 10 on the basis of information from the judging section 48 about the judgment-free area. Then, the display control section 49 displays the display data on the display section 10 (in step S54).

Figure 10:
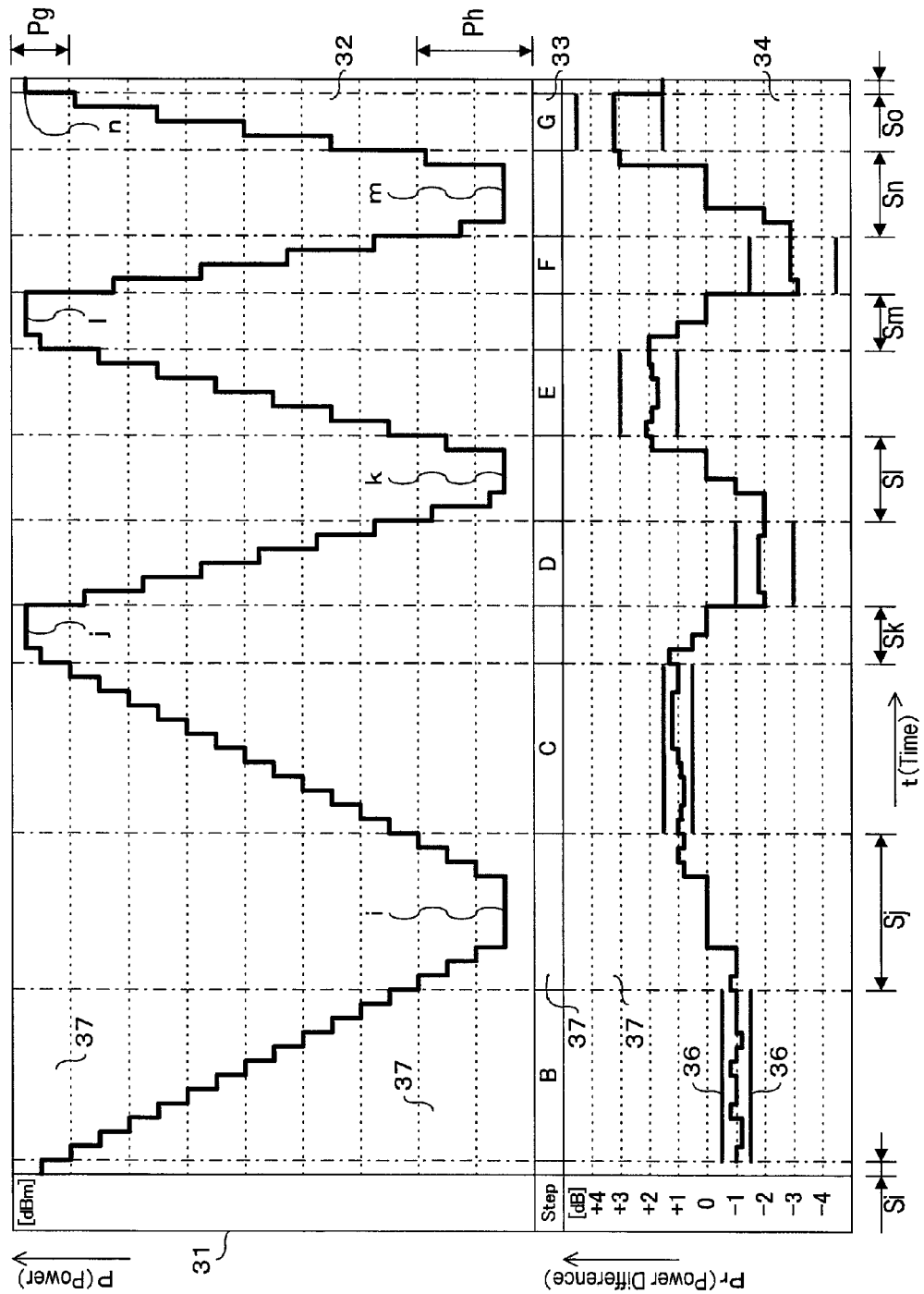
FIG. 10 is a graph showing an example displayed on a screen by the signal analyzer according to the second embodiment of the present invention.
Figure 11:
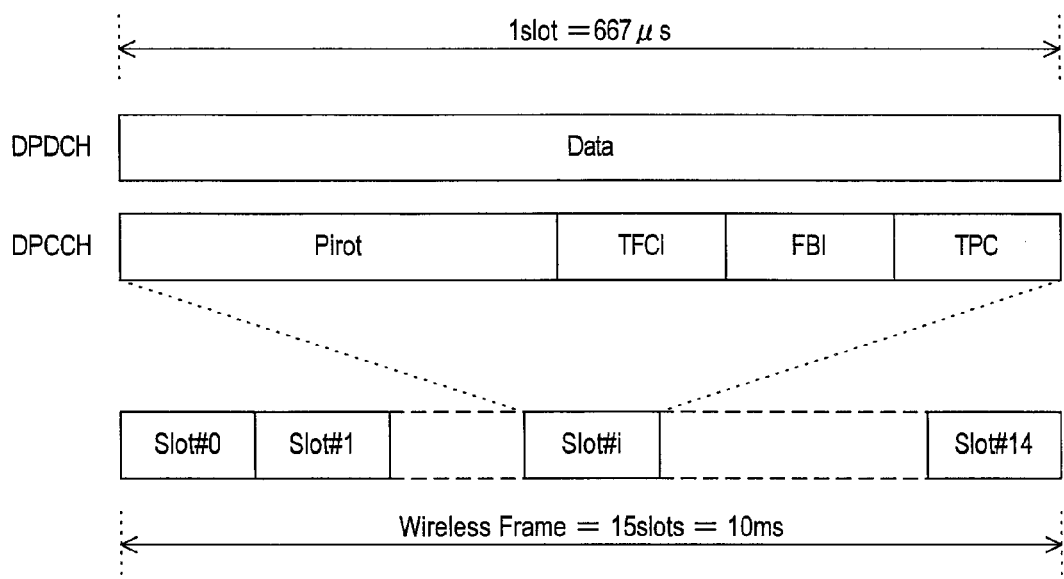
FIG. 11 is a view showing an uplink frame format for W-CDMA.
Figure 12:
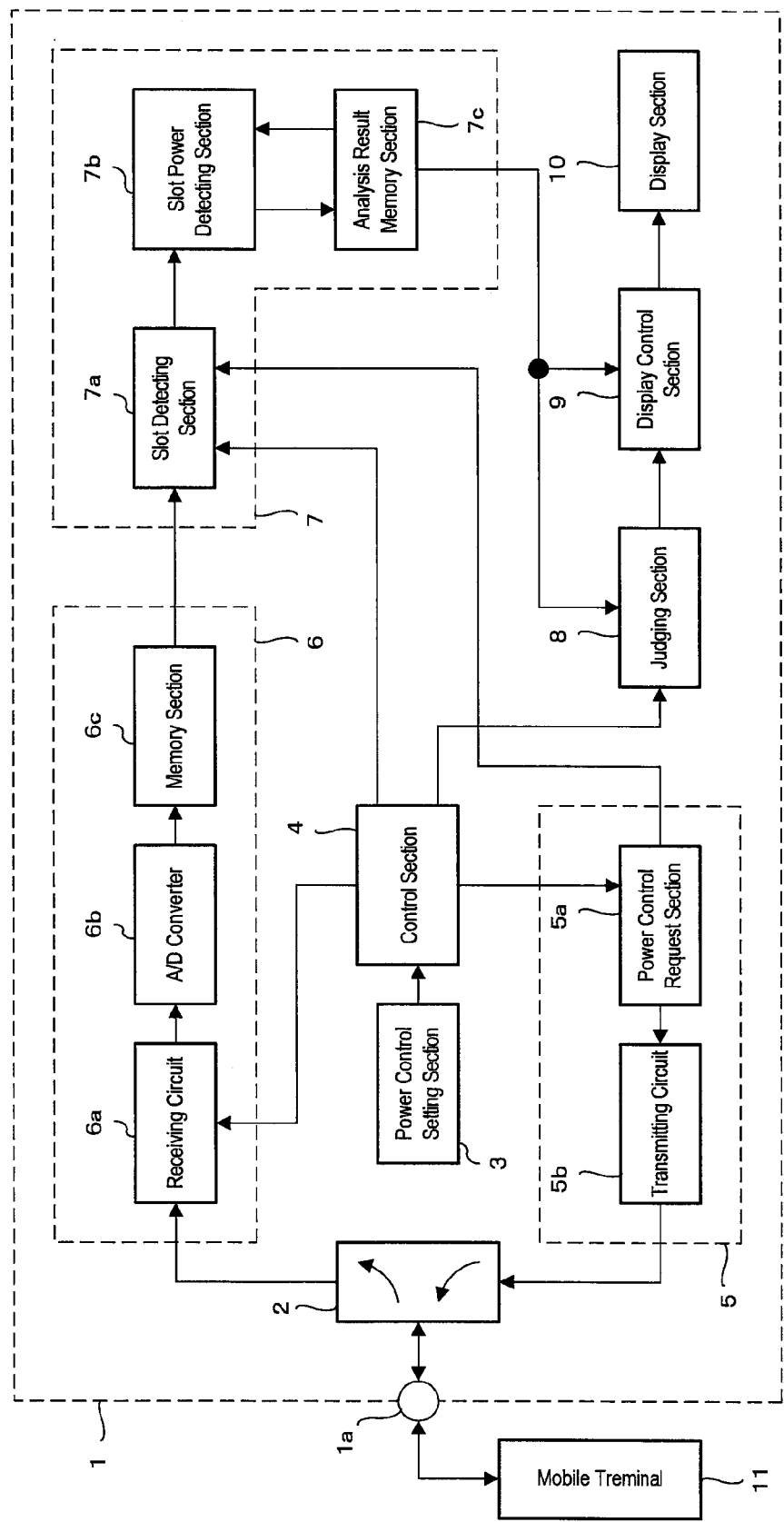
FIG. 12 is a block diagram showing the construction of the conventional signal analyzer.
Figure 13:
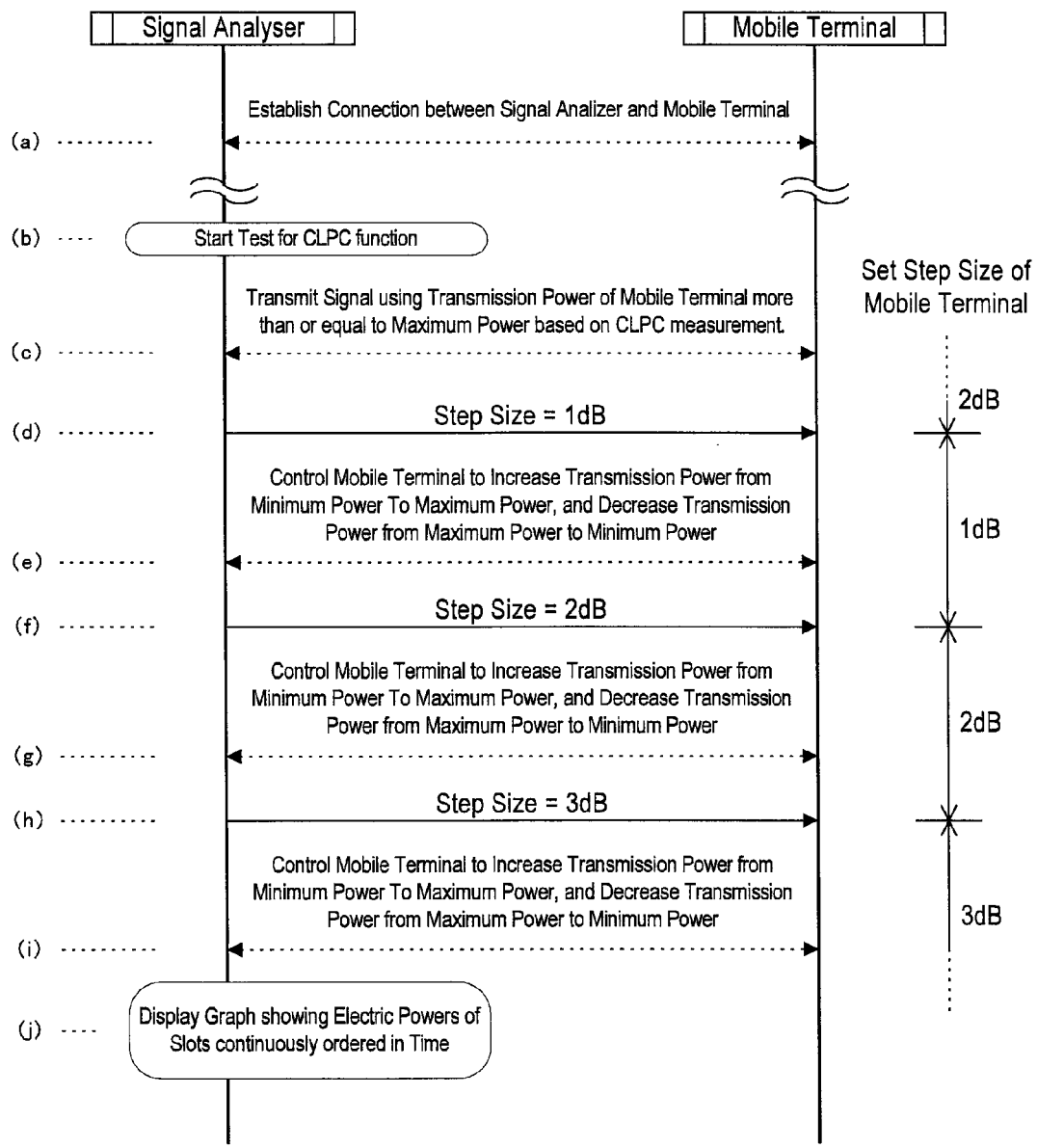
FIG. 13 is a diagram showing a sequence between the conventional signal analyzer and the mobile terminal.
Figure 14:
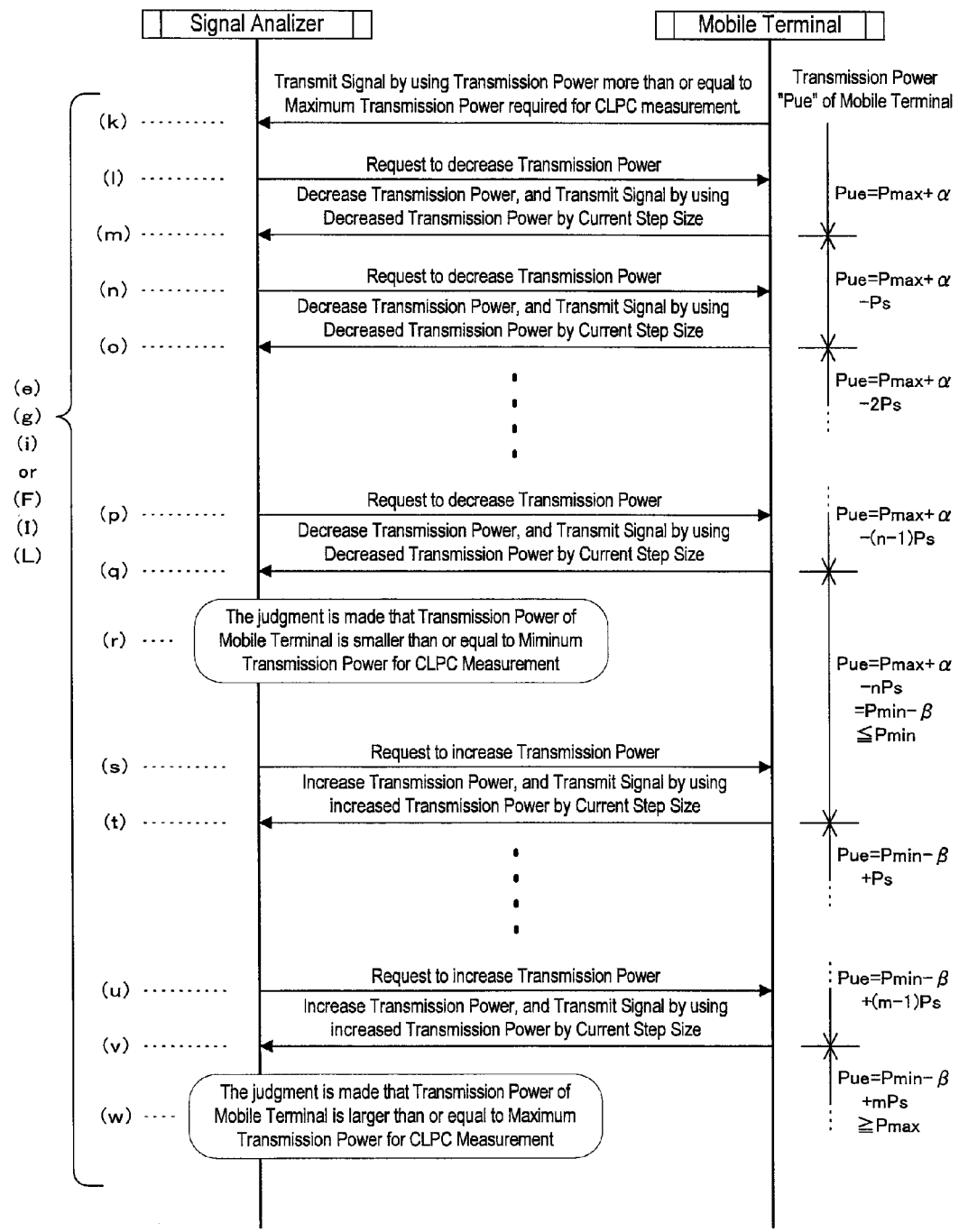
FIG. 14 is a diagram showing part of a sequence between the conventional signal analyzer and the mobile terminal.
Figure 15:
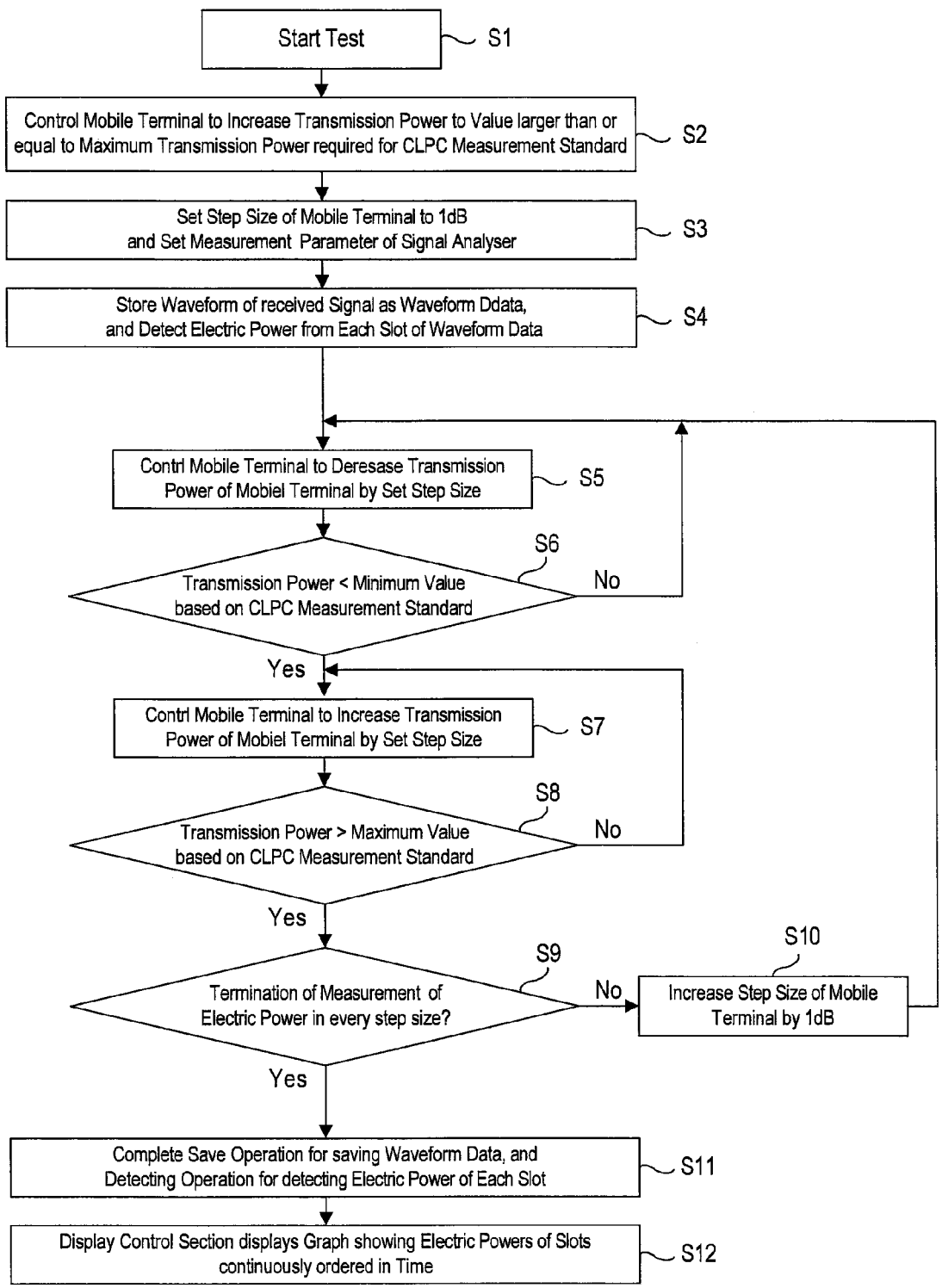
FIG. 15 is a flow chart showing the operation of the conventional signal analyzer.
Figure 16:
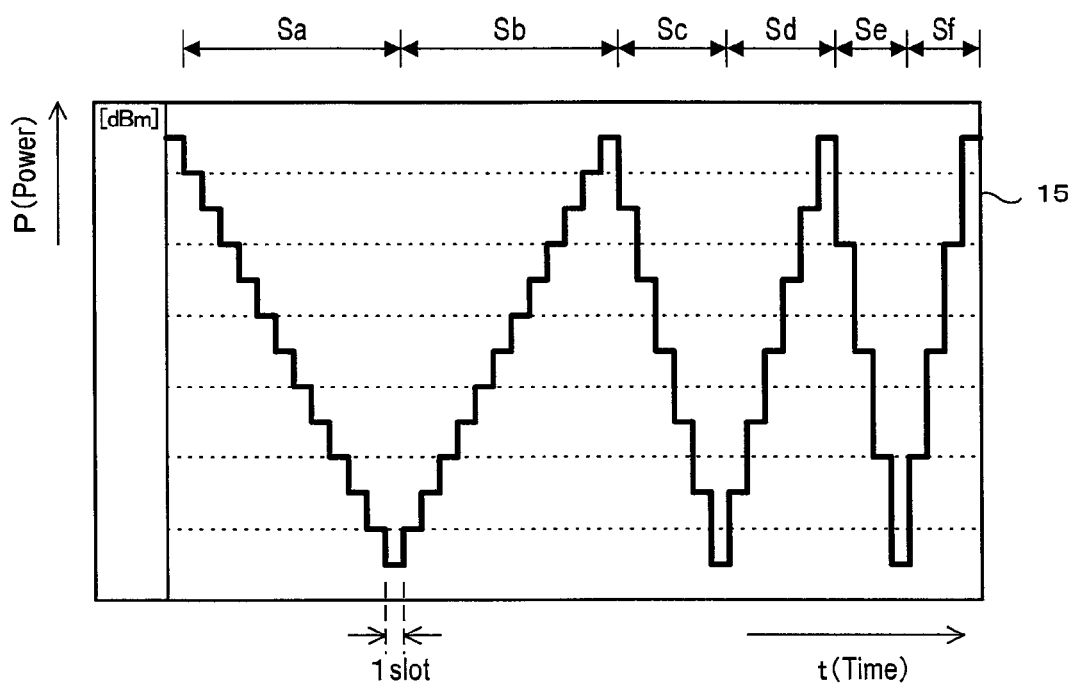
FIG. 16 is a graph showing an example displayed on a screen by the conventional signal analyzer.

FIG. 10 is a graph showing an example of analysis results displayed on the display section 10 of the signal analyzer 41. On one screen, the graph of FIG. 10 shows transmission powers of slots and relative quantities corresponding to transmission powers of those slots. An electric power graph display section 32, a classification display section 33, and a relative quantity graph display section 34 are on the screen 31.

On the electric power graph display section 32 of FIG. 10, colored areas "Pg" and "Ph" are defined as judgment-free areas 37 by the maximum and minimum values based on the CLPC measurement standard, and those areas are different in color from other areas. Therefore, the user can visually distinguish those colored areas from other areas.

Similarly, on the electric power graph display section 32 and the relative quantity graph display section 34 of the graph shown in FIG. 10, judgment-free areas 37 indicated by reference characters "Si" to "So" are colored, displayed on the basis of the judgment made by the judging section 48, and different in color from other areas. Therefore, the user can recognize the colored areas "Si" to "So" as judgment-free areas with ease. Additionally, reference lines 36 explained in the first embodiment are displayed in areas other than the judgment-free areas 37 of the relative quantity graph display section 34.

As will be seen from the electric power graph display section 32 and the relative quantity graph display section 34 of the graph shown in FIG. 10, the judgment-free areas 37 of the electric power graph display section 32 are specified by power values of the longitudinal axis, and the judgment-free areas 37 of the relative quantity graph display section 34 are specified by time of the horizontal axis (on "slot" basis). Therefore, it is easy to allow the user to recognize judgment-free areas by visually distinguishing judgment-free areas from other areas in the relative quantity graph display section 34 on "slot" basis.

The transmission power is maintained constant at points "i", "j", "k", "l", "m" and "n" in the electric power graph display section 32. This means that the transmission power reaches a maximum transmission power based on the CLPC measurement standard or a physical minimum transmission power in the process of increasing or decreasing the transmission power of the mobile terminal 11. When the transmission power reaches the maximum transmission power or the minimum transmission power, the transmission power is saturated and maintained constant without being further increased from the maximum transmission power or decreased from the minimum transmission power.

When the user analyzes the characteristic of the transmission power control of the mobile terminal 11, it is convenient to monitor not only normal measurement results but also irregular measurement results displayed on the basis of the CLPC measurement standard. For example, it is convenient to monitor the process of saturating the transmission power with the measurement results. Therefore, it is useful to display the judgment-free area in the relative quantity graph, by reason that the judgment-free area is checked with ease.

Additionally, the user can operate the display control section 49 through the setting operation section 23 to ensure that the display control section 49 does not display the judgment-free areas on the screen. More specifically, the display control section 49 can adjacently locate the steps "B" to "G" on the screen without the areas "Si" to "So" of FIG. 10.

As will be seen from the foregoing description, the signal analyzer according to the present invention is useful as a signal analyzer for analyzing a signal of a communication system, controlled in power with respect to each slot, such as for example TD-SCDMA, W-CDMA, and CDMA2000.

The invention claimed is:

1. A signal analyzer operable to receive a signal to be measured having a power controlled in slot units, to detect power values for respective slots of the received signal to be measured, and to display the detected power values for the slots with being arranged in time series on a display section, comprising:
   an analysis display control section for calculating, with respect to each slot corresponding to the power values arranged in time series, a relative quantity between a power value for one of the slots and a power value for another slot separated from the one of the slots by a predetermined number of slots, and displaying the calculated relative quantities with being continuously arranged in time series, in the form of a graph on the display section.

2. The signal analyzer as set forth in claim 1, wherein the analysis display control section is adapted to calculate, with respect to each slot, an error value indicative of the difference between a relative quantity of the corresponding slot and a reference value to be taken as the relative quantity of the corresponding slot, the calculated error values as the relative quantities with being continuously arranged in time series in the form of a graph on the display section.

3. The signal analyzer as set forth in claim 1, wherein the analysis display control section is adapted to calculate, with respect to each of the relative quantities arranged in time series, a difference value between two adjacent relative quantities, the calculated difference values with being continuously arranged in time series, in the form of a graph on the display section.

4. The signal analyzer as set forth in claim 1, further comprising a judging section for judging, with respect to each slot, whether the power value detected by the analysis display control section is normal or abnormal, and wherein
   based on a result of judgment by the judging section, the analysis display control section is adapted to distinguishably display on the graph, a slot judged as normal and a slot judged as abnormal.

5. The signal analyzer as set forth in claim 1, further comprising a judging section for judging, with respect to each slot, whether or not the power value detected by the analysis display control section is within a range, and wherein
   based on a result of judgment by the judging section, the analysis display control section is adapted to distinguishably display on the graph, a section including a slot judged as being within the range, and a section including a slot judged as being not within the range.

6. The signal analyzer as set forth in claim 5, wherein the judging section is adapted to judge, with respect to each slot, whether the power value detected by the analysis display control section is normal or abnormal and wherein based on a result of judgment by the judging section, the analysis display control section is adapted to distinguishably display on the graph, a slot judged as normal and a slot judged as abnormal.

7. The signal analyzer as set forth in claim 1, wherein the analysis display control section is adapted to display on the graph a reference line necessary to judge whether or not the relative quantity is normal.

8. The signal analyzer as set forth in claim 1, further comprising a setting operation section for setting the predetermined number, and wherein the analysis display control section is adapted to calculate the relative quantity on the basis of the predetermined number set by the setting operation section.

* * * * *